United States Patent [19]

Silverman et al.

[11] E Patent Number: Re. 32,097

[45] Reissued Date of Patent: Mar. 25, 1986

[54] BLENDED GRAIN DIRECT-POSITIVE EMULSIONS AND PHOTOGRAPHIC ELEMENTS AND PROCESSES FOR THEIR USE

[75] Inventors: Robert A. Silverman, Rochester; Harry A. Hoyen, Webster, both of N.Y.

[73] Assignee: Eastman Kodak Company, Rochester, N.Y.

[21] Appl. No.: 627,006

[22] Filed: Jul. 2, 1984

Related U.S. Patent Documents

Reissue of:

[64] Patent No.: 4,444,865
Issued: Apr. 24, 1984
Appl. No.: 418,314
Filed: Sep. 15, 1982

U.S. Applications:

[63] Continuation-in-part of Ser. No. 320,903, Nov. 12, 1981, abandoned.

[51] Int. Cl.[4] ..... G03C 1/02; G03C 1/36; G03C 7/00

[52] U.S. Cl. ..... 430/217; 430/940; 430/567; 430/503; 430/598; 430/603; 430/605; 430/564; 430/409; 430/410

[58] Field of Search ..... 430/217, 940, 567, 503, 430/598, 603, 605, 564, 409, 410

[56] References Cited

U.S. PATENT DOCUMENTS

| | | | |
|---|---|---|---|
| 2,456,953 | 12/1948 | Knott et al. | 430/409 |
| 2,592,250 | 4/1952 | Davey et al. | 430/569 |
| 3,206,313 | 9/1965 | Porter et al. | 430/564 |
| 3,600,180 | 8/1971 | Judd et al. | 430/940 |
| 3,615,573 | 10/1971 | Smith et al. | 430/502 |
| 3,761,276 | 9/1973 | Evans | 430/567 |
| 3,846,128 | 11/1974 | Thomas et al. | 430/219 |
| 3,850,637 | 11/1974 | Evans | 430/409 |
| 3,859,093 | 1/1975 | Beckey | 430/411 |
| 3,923,513 | 12/1975 | Evans | 430/217 |
| 4,023,972 | 5/1977 | Vanassche et al. | 430/567 |
| 4,035,185 | 7/1977 | Atwell et al. | 430/567 |
| 4,287,296 | 9/1981 | Vanassche et al. | 430/411 |
| 4,433,050 | 2/1984 | Abe et al. | 430/542 |

FOREIGN PATENT DOCUMENTS 2944944A 10/1980 United Kingdom .

OTHER PUBLICATIONS

Zelikman and Levi, *Making and Coating Photographic Emulsions*, Focal Press, 1964, pp. 234–238.

*Research Disclosure*, vol. 163, Nov. 1977, Item 16345.

*Primary Examiner*—Won H. Louie

*Attorney, Agent, or Firm*—Carl O. Thomas

[57] ABSTRACT

Blended emulsions for use in forming a direct-positive image are disclosed. The emulsions are comprised of a first, radiation-sensitive core-shell grain population having a relatively low coefficient of variation and a second, substantially smaller size grain population capable of *internally forming a latent image by* internally trapping photolytically generated electrons. Photographic elements incorporating the blended emulsions exhibit improved covering power and can exhibit enhanced speed.

34 Claims, No Drawings

BLENDED GRAIN DIRECT-POSITIVE EMULSIONS AND PHOTOGRAPHIC ELEMENTS AND PROCESSES FOR THEIR USE

Matter enclosed in heavy brackets [ ] appears in the original patent but forms no part of this reissue specification; matter printed in italics indicates the additions made by reissue.

*This application is a reissue application for U.S. Pat. No. 4,444,865, based on U.S. Ser. No. 418,314, filed Sept. 15, 1982, by Robert A. Silverman and Harry A. Hoyen, which is a continuation-in-part of U.S. Ser. No. 320,903, filed Nov. 12, 1981, now abandoned.*

[This is a continuation-in-part of copending U.S. Ser. No. 320,903, filed Nov. 12, 1981, now abandoned.]

This invention relates to improved direct-positive core-shell emulsions and to photographic elements incorporating these emulsions. The invention further relates to processes of obtaining direct-positive images from imagewise exposed photographic elements.

BACKGROUND OF THE INVENTION

Photographic elements which produce images having an optical density directly related to the radiation received on exposure are said to be negative-working. A positive photographic image can be formed by producing a negative photographic image and then forming a second photographic image which is negative of the first negative—that is, a positive image. A direct-positive image is understood in photography to be a positive image that is formed without first forming a negative image. Direct-positive photography is advantageous in providing a more straight-forward approach to obtaining positive photographic images.

A conventional approach to forming direct-positive images is to use photographic elements employing internal latent image-forming silver halide grains. After imagewise exposure, the silver halide grains are developed with a surface developer—that is, one which will leave the latent image sites within the silver halide grains substantially unrevealed. Simultaneously, either by uniform light exposure or by the use of a nucleating agent, the silver halide grains are subjected to development conditions that would cause fogging of a surface latent image forming photographic element. The internal latent image-forming silver halide grains which received actinic radiation during imagewise exposure develop under these conditions at a slow rate as compared to the internal latent image-forming silver halide grains not imagewise exposed. The result is a direct-positive silver image. In color photography, the oxidized developer that is produced during silver development is used to produce a corresponding positive, direct-positive dye image. Multicolor direct-positive photographic images have been extensively investigated in connection with image transfer photography.

Direct-positive internal latent image-forming emulsions can take the form of halide-conversion type emulsions. Such emulsions are illustrated by Knott et al. U.S. Pat. No. 2,456,953 and Davey et al. U.S. Pat. No. 2,592,250.

More recently the art has found it advantageous to employ core-shell emulsions as direct-positive internal latent image-forming emulsions. An early teaching of core-shell emulsions is provided by Porter et al. U.S. Pat. No. 3,206,313, wherein a coarse grain monodispersed chemically sensitized emulsion is blended with a finer grain emulsion. The blended finer grains are Ostwald ripened onto the chemically sensitized larger grains. A shell is thereby formed around the coarse grains. The chemical sensitization of the coarse grains is "buried" by the shell within the resulting core-shell grains. Upon imagewise exposure latent image sites are formed at internal sensitization sites and are therefore also internally located. The primary function of the shell structure is to prevent access of the surface developer to the internal latent image sites, thereby permitting low minimum densities.

The chemical sensitization of the core emulsion can take a variety of forms. One technique is to sensitize the core emulsion chemically at its surface with conventional sensitizers, such as sulfur and gold. Atwell et al. U.S. Pat. No. 4,035,185 teaches that controlling the ratio of middle chalcogen to noble metal sensitizers employed for core sensitization can control the contrast produced by the core-shell emulsion. Another technique that can be employed is to incorporate a metal dopant, such as iridium, bismuth, or lead, in the core grains as they are formed.

The shell of the core-shell grains need not be formed by Ostwald ripening, as taught by Porter et al., but can be formed alternatively by direct precipitation onto the sensitized core grains. Evans U.S. Pat. Nos. 3,761,276, 3,850,637, and 3,923,513 teach that further increases in photographic speed can be realized if, after the core-shell grains are formed, they are surface chemically sensitized. Surface chemical sensitization is, however, limited to maintain a balance of surface and internal sensitivity favoring the formation of internal latent image sites.

It is generally well known in the photographic art to employ mixtures of negative-working emulsions to control the shape and position of the characteristic curve of a photographic element. Such practices are discussed by Zelikman and Levi, Making and Coating Photographic Emulsions, Focal Press, 1964, pp. 234 to 238. Blending of surface fogged direct-positive emulsions is also well known in the art, as illustrated by Smith and Illingsworth U.S. Pat. No. 3,615,573.

Whereas conventional negative-working emulsions and surface fogged direct-positive emulsions have been commonly prepared as either monodisperse or heterodisperse emulsions and blending of these emulsions has been undertaken, the characteristics of core-shell emulsions has dictated their preparation as monodisperse emulsions. For example, the Ostwald ripening process of Porter et al., cited above, requires that both the core and shell emulsions be monodisperse. Further, even when precipitation directly onto the core emulsion is undertaken, as described by Evans, cited above, monodisperse core emulsions permit control and uniformity of shell formation.

Blending of core-shell emulsions has been taught prior to this invention only when core-shell grains of similar average grain size have been blended. For example, Atwell et al., cited above, successfully blends monodisperse core-shell emulsions differing in the ratio of sulfur to gold internal sensitization. More recently monodisperse core-shell emulsions of the same average grain size, but with differing levels of surface chemical sensitization have been successfully blended.

Hoyen U.S. Ser. No. 320,902, filed Nov. 12, 1981 and commonly assigned, titled DIRECT-POSITIVE CORE-SHELL EMULSIONS AND PHOTO- GRAPHIC ELEMENTS AND PROCESSES FOR THEIR USE, *now U.S. Pat. No. 4,395,478,* discloses the use of polyvalent metal ion dopants in the shell of core-shell emulsions to reduce rereversal.

Evans et al. U.S. Ser. No. 320,891, filed Nov. 12, 1981 and commonly assigned, titled DIRECT REVERSAL EMULSIONS AND PHOTOGRAPHIC ELEMENTS USEFUL IN IMAGE TRANSFER FILM UNITS now abandoned in favor of continuation-in-part U.S. Ser. No. 431,912, filed Sept. 30, 1982, *now abandoned in favor of U.S. Ser. No. 564,976, filed Dec. 23, 1983, issued as U.S. Pat. No. 4,504,570,* discloses image transfer film units containing tabular grain core-shell silver halide emulsions.

Black-and-white photography has relied traditionally upon developed silver to produce a viewable image. The silver that is not incorporated in the final image is frequently recovered, although in many applications, such as silver image transfer, for instance, silver is rarely recovered. Silver which forms the image is sometimes recovered, particularly from radiographic elements, but even in this instance the silver which remains in the element for imaging may be unavailable for reclamation for many years. Because of the cost of silver, it is highly desirable to make efficient use of it in photographic elements. One measure of the efficiency of silver use is covering power. Covering power is herein quantitatively defined as 100 times the ratio of maximum density to developed silver, expressed in grams per square decimenter. High covering power is recognized to be an advantaeous characteristic of black-and-white photographic elements. Covering power and conditions which affect it are discussed by James, Theory of the Photographic Process, 4th Ed., Macmillan, 1977, pp. 404, 489, and 490, and by Farnell and Soloman, "The Covering Power of Photographic Silver Deposits I. Chemical Development", The Journal of Photographic Science, Vol. 18, 1970, pp. 94–101.

SUMMARY OF THE INVENTION

In one aspect, this invention is directed to a radiation-sensitive emulsion particularly adapted to forming a direct-positive image comprised of a dispersing medium, a first core-shell silver halide grain population having a coefficient of variation of less than 20%, and a second silver halide grain population capable of *internally forming a latent image by* internally trapping photolytically generated electrons and substantially incapable of forming a surface latent image within the direct-positive exposure latitude of the first grain population. The second grain population has an average diameter less than 70% that of the first grain population, and the first and second silver halide grain populations are present in a weight ratio of from 5:1 to 1:5.

In another aspect, this invention is directed to a photographic element comprised of a support and at least one radiation-sensitive emulsion as described above.

In still another aspect, this invention is directed to processing in a surface developer an imagewise exposed photographic element as described above (1) in the presence of a nucleating agent or (2) with light-flashing of the exposed photographic element during processing.

It is an advantage of the present invention that increased silver covering power can be realized with the blended grain population emulsions. This is totally unexpected from the prior uses of core-shell emulsions. In certain preferred forms more specifically described below increased photograhic speed for photographic elements according to the present invention can be realized, even when silver coverage is reduced.

As taught by Hoyen, cited above, when the emulsions of the present invention incorporate a polyvalent metal ion as a shell dopant, rereversal of the emulsions is reduced. Rereversal can also be reduced by forming the shell portion of the core-shell grains with increasing concentrations of iodide, as taught by Evans et al., cited above. As further taught by Hoyen, in embodiments in which the shell portion of the grains contain chloride, reduction of low intensity reciprocity failure and more rapid processing can also be realized. Still other advantages of this invention will become apparent from consideration of the following detailed description of the invention.

DESCRIPTION OF PREFERRED EMBODIMENTS

The emulsions of the present invention are particularly adapted to forming direct-positive photographic images. The emulsions are comprised of a dispersing medium and at least two distinct silver halide grain populations. The first grain population consists of core-shell silver halide grains which are monodisperse. That is, the core-shell silver halide grains have a coefficient of variation of less than 20%. For applications requiring high contrast (at least 5 and more typically at least 8) it is preferred that the core-shell silver halide grains have a coefficient of variation of less than 10%. (As employed herein the coefficient of variation is defined as 100 times the standard deviation of the grain diameters divided by the average grain diameter.) Blended with the first grain population is a second silver halide grain population. The second silver halide grain population is capable of *internally forming a latent image by* internally trapping photolytically generated electrons and is substantially incapable of forming a surface latent image within the direct-positive exposure latitude of the emulsion. The second grain population has an average diameter less than 70% that of the first grain population, preferably less than 50% and optimally less than 40% that of the first grain population. The first and second grain populations are present in the emulsion in a weight ratio of from 5:1 to 1:5, preferably 2:1 to 1:3, respectively.

Silver Halide Grain Blends

The emulsions of the present invention can be prepared by blending emulsions previously individually known to those skilled in the art. The first grain population can be provided by a conventional core-shell emulsion, such as any one of those described by Porter et al. U.S. Pat. No. 3,206,313, Evans U.S. Pat. Nos. 3,761,276, 3,850,637, and 3,923,513, and Atwell et al. U.S. Pat. No. 4,035,185, here incorporated by reference to provide a disclosure of such features. Accordingly, the following discussion is confined to certain core-shell emulsion features which are particularly preferred and to those features which differ from the teachings of the Porter et al., Evans, and Atwell et al. patents.

Useful core-shell emulsions can be prepared by first forming a sensitized core emulsion. The core emulsion can be comprised of silver bromide, silver chloride, silver chlorobromide, silver chloroiodide, silver bromoiodide, or silver chlorobromoiodide grains. The grains can be coarse, medium, or fine and can be bounded by {100}, {111}, or {110} crystal planes. The core grains can be high aspect ratio tabular grains, as taught by Evans et al., cited above. The coefficient of variation of the core grains should be no higher than the desired coefficient of variation of the completed core-shell grains.

Perhaps the simplest manipulative approach to forming sensitized core grains is to incorporate a metal dopant within the core grains as they are being formed. The metal dopant can be placed in the reaction vessel in which core grain formation occurs prior to the introduction of silver salt. Alternately the metal dopant can be introduced during silver halide grain growth at any stage of precipitation, with or without interrupting silver and/or halide salt introduction.

Iridium is specifically contemplated as a metal dopant. It is preferably incorporated within the silver halide grains in concentrations from about $10^{-8}$ to $10^{-4}$ mole per mole of silver. The iridium can be conveniently incorporated into the reaction vessel as a water soluble salt, such as an alkali metal salt of a halogen-iridium coordination complex, such as sodium or potassium hexachloroiridate or hexabromoiridate. Specific examples of incorporating an iridium dopant are provided by Berriman U.S. Pat. No. 3,367,778.

Lead is also a specifically contemplated metal dopant for core grain sensitization. Lead is a common dopant in direct print and printout emulsions and can be employed in the practice of this invention in similar concentration ranges. It is generally preferred that the lead dopant be present in a concentration of at least $10^{-4}$ mole per mole of silver. Concentrations up to about $5\times10^{-2}$, preferably $2\times10^{-2}$, mole per mole of silver are contemplated. Lead dopants can be introduced similarly as iridium dopants in the form of water soluble salts, such as lead acetate, lead nitrate, and lead cyanide. Lead dopants are particularly illustrated by McBride U.S. Pat. No. 3,287,136 and Bacon U.S. Pat. No. 3,531,291.

Another technique for sensitizing the core grains is to stop silver halide grain precipitation after the core grain has been produced and to sensitize chemically the surface of the core. Thereafter additional precipitation of silver halide produces a shell surrounding the core. Particularly advantageous chemical sensitizers for this purpose are middle chalcogen sensitizers—i.e., sulfur, selenium, and/or tellurium sensitizers. Middle chalcogen sensitizers are preferably employed in concentrations in the range of from about 0.05 to 15 mg per silver mole. Preferred concentrations are from about 0.1 to 10 mg per silver mole. Further advantages can be realized by employing a gold sensitizer in combination. Gold sensitizers are preferably employed in concentrations ranging from 0.5 to 5 times that of the middle chalcogen sensitizers. Preferred concentrations of gold sensitizers typically range from about 0.01 to 40 mg per mole of silver, most preferably from about 0.1 to 20 mg per mole of silver. Controlling contrast by controlling the ratio of middle chalcogen to gold sensitizer is particularly taught by Atwell et al. U.S. Pat. No. 4,035,185, cited above and here incorporated by reference specifically for this teaching. Evans, cited above, provides specific examples of middle chalcogen core grain sensitizations.

Although preferred, it is not essential that the core grains be sensitized prior to shelling to form the completed core-shell grains. It is merely necessary that the core-shell grains as formed be capable of forming internal latent image sites. Internal sensitization sites formed by shelling of sensitized core grains—that is, occlusion of foreign (i.e., other than silver and halogen) materials within the core-shell grains—are hereinafter referred to as internal chemical sensitization sites to distinguish them from internal physical sensitization sites. It is possible to incorporate internal physical sensitization sites by providing irregularities in the core-shell grain crystal lattice. Such internal irregularities can be created by discontinuities in silver halide precipitation or by abrupt changes in the halide content of the core-shell grains. For example, it has been observed that the precipitation of a silver bromide core followed by shelling with silver bromoiodide of greater than 5 mole percent iodide requires no internal chemical sensitization to produce a direct-positive image.

Although the sensitized core emulsion can be shelled by the Ostwald ripening technique of Porter et al., cited above, it is preferred that the silver halide forming the shell portion of the grains be precipitated directly onto the sensitized core grains by the double-jet addition technique. Double-jet precipitation is well known in the art, as illustrated by Research Disclosure, Vol. 176, December 1978, Item 17643, Section I, here incorporated by reference. Research Disclosure and its predecessor, Product Licensing Index, are publications of Industrial Opportunities Ltd., Homewell. Havant, Hampshire, P09 1EF, United Kingdom. The halide content of the shell portion of the grains can take any of the forms described above with reference to the core emulsion. To improve developability it is preferred that the shell portion of the grains contain at least 80 mole percent chloride, the remaining halide being bromide or bromide and up to 10 mole percent iodide. (Except as otherwise indicated, all references to halide percentages are based on silver present in the corresponding emulsion, grain, or grain region being discussed.) Improvements in low intensity reciprocity failure are also realized when the shell portion of the core-shell grains is comprised of at least 80 mole percent chloride, as described above. For each of these advantages silver chloride is specifically preferred. On the other hand, the highest realized photographic speeds are generally recognized to occur with predominantly bromide grains, as taught by Evans, cited above. Thus, the specific choice of a preferred halide for the shell portion of the core-shell grains will depend upon the specific photographic application. When the same halides are chosen for forming both the core and shell portions of the core-shell grain structure, it is specifically contemplated to employ double-jet precipitation for producing both the core and shell portions of the grains without interrupting the introduction of silver and halide salts in the transition from core to shell formation.

The silver halide forming the shell portion of the core-shell grains must be sufficient to restrict developer access to the sensitized core portion of the grains. This will vary as a function of the ability of the developer to dissolve the shell portion of the grains during development. Although shell thicknesses as low as a few crystal lattice planes for developers having very low silver halide solvency are taught in the art, it is preferred that the shell portion of the core-shell grains be present in a molar ratio with the core portion of the grains of about 1:4 to 8:1, as taught by Porter et al. and Atwell et al., cited above.

The amount of overexposure which can be tolerated by the emulsion of this invention without encountering rereversal can be increased by incorporating into the core-shell grains metal dopants for this purpose. As employed herein the term "rereversal" refers to the negative-working characteristic exhibited by an overexposed direct-positive emulsion. (Rereversal is the converse of solarization, a positive-working characteristic exhibited by an overexposed negative-working emulsion.) Hoyen, cited above and here incorporated by reference, discloses the use of polyvalent metal ions as dopants in the shell of core-shell emulsions to reduce rereversal. Preferred metal dopants for this purpose are divalent and trivalent cationic metal dopants, such as cadmium, zinc, lead, and erbium. These dopants are generally effective at concentration levels below about $5\times10^{-4}$, preferably below $5\times10^{-5}$, mole per mole of silver. Dopant concentrations of at least $10^{-6}$, preferably at least $5\times10^{-6}$, mole per silver, should be present in the reaction vessel during silver halide precipitation. The reversal modifying dopant is effective if introduced at any stage of silver halide precipitation. The rereversal modifying dopant can be incorporated in either or both of the core and shell. It is preferred that the dopant be introduced during the latter stages of precipitation (e.g., confined to the shell) when the core-shell grains are high aspect ratio tabular grains. The metal dopants can be introduced into the reaction vessel as water soluble metal salts, such as divalent and trivalent metal halide salts. Zinc, lead, and cadmium dopants for silver halide in similar concentrations, but to achieve other modifying effects, are disclosed by McBride U.S. Pat. No. 3,287,136, Mueller et al. U.S. Pat. No. 2,950,972, Iwaosa et al. U.S. Pat. No. 3,901,711, and Atwell U.S. Pat. No. 4,269,927. Other techniques for improving rereversal characteristics discussed below can be employed independently or in combination with the metal dopants described.

After precipitation of a shell portion onto the sensitized core grains to complete formation of the core-shell grains, the emulsions can be washed, if desired, to remove soluble salts. Conventional washing techniques can be employed, such as those disclosed by Research Disclosure, Item 17643, cited above, Section II, here incorporated by reference.

Since the core-shell emulsions are intended to form internal latent images, intentional sensitization of the surfaces of the core-shell grains is not essential. However, to achieve the highest attainable reversal speeds, it is preferred that the core-shell grains be surface chemically sensitized, as taught by Evans and Atwell et al., cited above. Any type of surface chemical sensitization known to be useful with corresponding surface latent image-forming silver halide emulsions can be employed, such as disclosed by Research Disclosure, Item 17643, cited above, Section III. Middle chalcogen and/or noble metal sensitizations, as described by Atwell et al., cited above, are preferred. Sulfur, selenium and gold are specifically preferred surface sensitizers.

The degree of surface chemical sensitization is limited to that which will increase the reversal speed of the internal light image-forming emulsion, but which will not compete with the internal sensitization sites to the extent of causing the location of latent image center formed on exposure to shift from the interior to the surface of the tabular grains. Thus, a balance between internal and surface sensitization is preferably maintained for maximum speed, but with the internal sensitization predominating. Tolerable levels of surface chemical sensitization can be readily determined by the following test: A sample of the high aspect ratio tabular grain internal latent image-forming silver halide emulsion of the present invention is coated on a transparent film support at a silver coverage of 4 grams per square meter. The coated sample is then exposed to a 500 watt tungsten lamp for times ranging from 0.01 to 1 second at a distance of 0.6 meter. The exposed coated sample is then developed for 5 minutes at 20° C. in Developer Y below (an "internal type" developer, note the incorporation of iodide to provide access to the interior of the grain), fixed, washed, and dried. The procedure described above is repeated with a second sample identically coated and exposed. Processing is also identical, except that Developer X below (a "surface type" developer) is substituted for Developer Y. To satisfy the requirements of the present invention as being a useful internal latent image-forming emulsion the sample developed in the internal type developer, Developer Y, must exhibit a maximum density at least 5 times greater than the sample developed in the surface type developer, Developer X. This difference in density is a positive indication that the latent image centers of the silver halide grains are forming predominantly in the interior of the grains and are for the most part inaccessible to the surface type developer.

| Developer X | Grams |
|---|---|
| N—methyl-p-aminophenol sulfate | 2.5 |
| Ascorbic acid | 10.0 |
| Potassium metaborate | 35.0 |
| Potassium bromide | 1.0 |
| Water to 1 liter. | |

| Developer Y | Grams |
|---|---|
| N—methyl-p-aminophenol sulfate | 2.0 |
| Sodium sulfite, desiccated | 90.0 |
| Hydroquinone | 8.0 |
| Sodium carbonate, monohydrate | 52.5 |
| Potassium bromide | 5.0 |
| Potassium iodide | 0.5 |
| Water to 1 liter. | |

In one specifically preferred form the core-shell emulsions employed in the practice of this invention are high aspect ratio tabular grain core-shell emulsions, as disclosed by Evans et al., cited above and here incorporated by reference. As applied to the emulsions the term "high aspect ratio" is herein defined as requiring that the core-shell grains having a thickness of less than 0.5 micron (preferably 0.3 micron) and a diameter of at least 0.6 micron have an average aspect ratio of greater than 8:1 and account for at least 50 percent of the total projected surface area of the core-shell silver halide grains.

As employed herein the term "aspect ratio" refers to the ratio of the diameter of the grain to its thickness. The "diameter" of the grain is in turn defined as the diameter of a circle having an area equal to the projected area of the grain as viewed in a photomicrograph of an emulsion sample. The core-shell tabular grains of Evans et al. have an average aspect ratio of greater than 8:1 and preferably have an average aspect ratio of greater than 10:1. Under optimum conditions of preparation aspect ratios of 50:1 or even 100:1 are contemplated. As will be apparent, the thinner the grains, the higher their aspect ratio for a given diameter. Typically grains of desirable aspect ratios are those having an average thickness of less than 0.5 micron, preferably less than 0.3 micron, and optimally less than 0.2 micron. Typically the tabular grains have an average thickness of at least 0.05 micron, although even thinner tabular grains can in principle be employed. In a preferred form of the invention the tabular grains account for at least 70 percent and optimally at least 90 percent of the total projected surface area of the core-shell silver halide grains. Tabular grain average diameters are in all instances less than 30 microns, preferably less than 15 microns, and optimally less than 10 microns.

A second emulsion can be blended with the core-shell emulsions described above to produce an emulsion according to the present invention. The purpose of blending the second emulsion is to provide a second silver halide grain population intimately intermingled with the low coefficient of variation first, core-shell grain population. In blending the second emulsion with the core-shell emulsion consideration must be given (1) to the relative proportion of the first and second grain populations, (2) the relative grain size of the first and second grain populations, and (3) the specific characteristics of the silver halide grains making up the second grain population. Although emulsion blending is preferred, any technique for bringing the second grain population into proximity with the first grain population is within the purview of the present invention.

The relative proportions of the first and second grain populations, (1) above, can be varied. As noted above, a weight ratio of the first and second grain populations in the range of from 5:1 to 1:5 is generally contemplated, with weight ratio of from 2:1 to 1:3 being preferred for most applications. If the second grain population falls below the minimum proportions indicated above, the advantages of the present invention will not be fully realized. Similarly, if the second grain population is increased to higher than indicated proportions, improvements in silver coverage will not be fully realized. Nevertheless, since photographic elements frequently constitute a balance of competing demands to satisfy the needs of a specific end use wider than indicated variations in the weight ratios of the first and second grain populations can not be ruled out.

The relationship of the average grain sizes of the first and second grain populations, (2) above, are such that the second grain population has an average diameter less than 70%, preferably less than 50%, and optimally less than 40% that of the first, core-shell grain population. The second grain population can be either heterodisperse or monodisperse. It is generally preferred that the coefficient of variation of the second grain population be less than about 30%, although higher coefficients of variation can be readily tolerated at smaller average grain sizes. The first, core-shell grain population can have any convenient conventional average grain size. The specific choice will depend upon the specific photographic application and will include a variety of factors, such as desired photographic speed (which generally increases with increasing grain size), covering power (which generally decreases with increasing grain size), and granularity (which generally increases with increasing grain size). Average grain diameters for tabular grain core-shell emulsions are provided above. For nontabular core-shell grains average diameters of less than about 3.0 microns, preferably less than about 2.0 microns, are normally contemplated. It is generally advantageous for the second grain population to have the smallest average grain diameter that can be conveniently prepared. This will vary as a function of the composition and structure of the second grain population. Generally average grain diameters of less than 1.0 micron and preferably less than 0.5 micron are contemplated for the second grain population.

The further specific characteristics of the silver halide grains making up the second grain population, (3) above, are (a) that the second population grains be capable of internally trapping photolytically generated electrons and (b) that the second grain population be substantially incapable of forming a surface latent image within the direct-positive exposure latitude of the first grain population.

When a photon is captured by a silver halide grain on exposure, an electron and a hole pair are generated within the crystal structure of the grain. Internal latent image forming silver halide grains capture photolytically generated electrons internally. Thus, the second grain population can be chosen from among silver halide grains capable of forming an internal latent image. [The second grain population is not, however, limited to internal latent image forming grains. Photolytically generated electrons can be efficiently captured internally by internally fogged grains, which are incapable of forming latent images on exposure. It is in general preferred to employ conventional internal latent image forming silver halide grains or grains of this type which have been internally fogged by light exposure to form the second grain population.]

The further consideration (b) of the second grain population is that it be substantially incapable of forming a surface latent image within the direct-positive exposure latitude of the first grain population. Stated somewhat more quantitatively, when a photographic element containing first and second grain populations according to the invention is imagewise exposed and processed in a surface developer to produce a direct-positive image, the second grain population is, by its presence, incapble of increasing the minimum density to more than 20% of the maximum image density. Preferably the minimum density should be less than 10% of the maximum density and, optimally, less than 5%. (Acceptable minimum densities vary considerably with the specific photographic application, with projection films, for example, being capable of tolerating much higher minimum densities than reflection prints.) With the first grain population omitted, the second grain population preferably produces a difference in density between exposed and unexposed areas (image discrimination) of less than 0.2, optimally less than 0.05. The fact that the second grain population can be made to produce higher minimum densities or larger density differences at varied exposure levels or processing conditions is immaterial, so long as less than the indicated values are realized under the conditions of exposure and processing contemplated for producing a direct-positive image in the photographic element containing the second grain population. For example, it is specifically contemplated to employ as a second grain population a core-shell emulsion requiring an extended period of development, as compared to the photographic element in which it is incorporated, to produce substantial image discrimination.

Subject to the considerations indicated above, the second grain population can be provided by blending with the first, core-shell emulsion a conventional internal latent image forming emulsion [or such an emulsion that has been internally fogged]. It is specifically contemplated to employ halide-conversion type emulsions to provide the second grain population. Converted halide emulsions are illustrated by Knott et al. U.S. Pat.

No. 2,456,953 and Davey et al. U.S. Pat. No. 2,592,250. As is well understood by those skilled in the art, halide-conversion emulsions can be prepared by bringing a silver chloride emulsion into contact with bromide and, optionally, iodide salts. The bromide and, optionally, iodide salts displace chloride ions in the silver chloride crystal lattice producing internal crystal irregularities which function as internal electron trapping sites. Generally converted halide grains are comprised of at least 50 mole percent bromide, preferably at least 80 mole percent bromide, based on total halide. The balance of the halide present is chloride, optionally in combination with iodide. Iodide is usually present in a concentration of less than about 10 mole percent, based on total halide.

In a specifically preferred form of the invention the grains of the second population are also core-shell grains. They can be identical to the core-shell grains of the first grain population, subject to the considerations noted above. In general, when the second core-shell grain population satisfies the relative size requirements of the two grain populations the other considerations will also be satisfied when the first and second grain populations are of the same silver halide composition and similarly internally sensitized. Maintaining the second grain population substantially free of intentional surface chemical sensitization is also advantageous both in reducing the surface latent image forming capability of the second grain population within the direct-positive exposure latitude of the blended emulsion and in increasing the reversal speed of the blended emulsion. It is specifically preferred to blend core-shell emulsions having surface chemical sensitization of the type disclosed by Evans and Atwell et al., cited above, to form the first grain population with similar core-shell grains of smaller average grain size and free of or exhibiting reduced surface chemical sensitization forming the second grain population.

The blended emulsions of the present invention can, if desired, be spectrally sensitized. Only the first grain population need have spectral sensitizing dye adsorbed to their surfaces, but where spectral sensitization follows blending, dye can be adsorbed to both grain populations. For multicolor photographic applications red, green, or, optionally, blue spectral sensitizing dyes can be employed, depending upon the portion of the visible spectrum the core-shell grains are intended to record. For black-and-white imaging applications spectral sensitizing is not required, although orthochromatic or panchromatic sensitization is usually preferred. Generally, any spectral sensitizing dye or dye combination known to be useful with a negative-working silver halide emulsion can be employed with the blended emulsions of the present invention. Illustrative spectral sensitizing dyes are those disclosed in Research Disclosure, Item 17643, cited above, Section IV. Particularly preferred spectral sensitizing dyes are those disclosed in Research Disclosure, Vol. 151, November 1976, Item 15162, here incorporated by reference. Although the emulsions can be spectrally sensitized with dyes from a variety of classes, preferred spectral sensitizing dyes are polymethine dyes, which include cyanine, merocyanine, complex cyanine and merocyanine (i.e., tri-, tetra, and poly-nuclear cyanine and merocyanine), oxonol, hemioxonol, styryl, merostyryl, and streptocyanine dyes. Cyanine and merocyanine dyes are specifically preferred. Spectral sensitizing dyes which sensitize surface-fogged direct-positive emulsions generally desensitize both negative-working emulsions and the core-shell emulsions of this invention and therefore are not normally contemplated for use in the practice of this invention. Spectral sensitization can be undertaken at any stage of emulsion preparation heretofore known to be useful. Most commonly spectral sensitization is undertaken in the art subsequent to the completion of chemical sensitization. However, it is specifically recognized that spectral sensitization can be undertaken alternatively concurrently with chemical sensitization or can entirely precede surface chemical sensitization. Sensitization can be enhanced by pAg adjustment, including cycling, during chemical and/or spectral sensitization.

Nucleating Agents

It has been found advantageous to employ nucleating agents in preference to uniform light exposure in processing. The term "nucleating agent" (or "nucleator") is employed herein in its art-recognized usage to mean a fogging agent capable of permitting the selective development of internal latent image-forming silver halide grains which have not been imagewise exposed in preference to the development of silver halide grains having an internal latent image formed by imagewise exposure.

The blended emulsions of this invention preferably incorporate a nucleating agent to promote the formation of a direct-positive image upon processing. The nucleating agent can be incorporated in the emulsion during processing, but it is preferably incorporated in manufacture of the photographic element, usually prior to coating. This reduces the quantities of nucleating agent required. The quantities of nucleating agent required can also be reduced by restricting the mobility of the nucleating agent in the photographic element. Large organic substituents capable of performing at least to some extent a ballasting function are commonly employed. Nucleating agents which include one or more groups to promote adsorption to the surface of the silver halide grains have been found to be effective in extremely low concentrations.

A preferred general class of nucleating agents for use in the practice of this invention are aromatic hydrazides. Particularly preferred aromatic hydrazides are those in which the aromatic nucleus is substituted with one or more groups to restrict mobility and, preferably, promote adsorption of the hydrazide to silver halide grain surfaces. More specifically, preferred hydrazides are those embraced by formula (I) below:

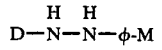

$$D-\overset{H}{N}-\overset{H}{N}-\phi\text{-}M \qquad (I)$$

wherein

D is an acyl group;

$\phi$ is a phenylene or substituted (e.g., halo-, alkyl-, or alkoxy-substituted) phenylene group; and M is a moiety capable of restricting mobility, such as an adsorption promoting moiety.

A particularly preferred class of phenylhydrazides are acylhydrazinophenylthioureas represented by formula (II) below.

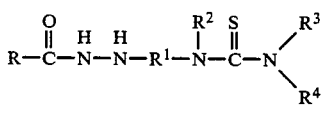

$$R-\overset{O}{\overset{\|}{C}}-\overset{H}{N}-\overset{H}{N}-R^1-\overset{R^2}{\overset{|}{N}}-\overset{S}{\overset{\|}{C}}-N\begin{matrix}R^3\\R^4\end{matrix} \qquad (II)$$

wherein

R is hydrogen or an alkyl, cycloalkyl, haloalkyl, alkoxyalkyl, or phenylalkyl substituted or a phenyl nucleus having a Hammett sigma-value-derived electron-withdrawing characteristic more positive than —0.30;

$R^1$ is a phenylene or alkyl, halo-, or alkoxy-substituted phenylene group;

$R^2$ is hydrogen, benzyl, alkoxybenzyl, halobenzyl, or alkylbenzyl;

$R^3$ is a alkyl, haloalkyl, alkoxyalkyl, or phenylalkyl substituent having from 1 to 18 carbon atoms, a cycloalkyl substituent, a phenyl nucleus having a Hammet sigma value-derived electron-withdrawing characteristic less positive than +0.50, or naphthyl, $R^4$ is hydrogen or independently selected from among the same substituents as $R^3$; or $R^3$ and $R^4$ together form a heterocyclic nucleus forming a 5- or 6-membered ring, wherein the ring atoms are chosen from the class consisting of nitrogen, carbon, oxygen, sulfur, and selenium atoms;

with the proviso that at least one of $R^2$ and $R^4$ must be hydrogen and the alkyl moieties, except as otherwise noted, in each instance include from 1 to 6 carbon atoms and the cycloalkyl moieties have from 3 to 10 carbon atoms.

As indicated by R in formula (II), preferred acylhydrazinophenylthioureas employed in the practice of this invention contain an acyl group which is the residue of a carboxylic acid, such as one of the acyclic carboxylic acids, including formic acid, acetic acid, propionic acid, butyric acid, higher homologues of these acids having up to about 7 carbon atoms, and halogen, alkoxy, phenyl and equivalent substituted derivatives thereof. In a preferred form, the acyl group is formed by an unsubstituted acyclic aliphatic carboxylic acid having from 1 to 5 carbon atoms. Specifically preferred acyl groups are formed and acetyl. As between compounds which differ solely in terms of having a formyl or an acetyl group, the compound containing the formyl group exhibits higher nucleating agent activity. The alkyl moieties in the substituents to the carboxylic acids are contemplated to have from 1 to 6 carbon atoms, preferably from 1 to 4 carbon atoms.

In addition to the acyclic aliphatic carboxylic acids, it is recognized that the carboxylic acid can be chosen so that R is a cyclic aliphatic group having from about 3 to 10 carbon atoms, such as, cyclopropyl, cyclobutyl, cyclopentyl, cyclohexyl, methylcyclohexyl, cyclooctyl, cyclodecyl, and bridged ring variations, such as, bornyl and isobornyl groups. Cyclohexyl is a specifically preferred cycloalkyl substituent. The use of alkoxy, cyano, halogen, and equivalent substituted cycloalkyl substituents is contemplated.

As indicated by $R^1$ in formula (II), preferred acylhydrazinophenylthioureas employed in the practice of this invention contain a phenylene or substituted phenylene group. Specifically preferred phenylene groups are m- and p-phenylene groups. Exemplary of preferred phenylene substituents are alkoxy substituents having from 1 to 6 carbon atoms, alkyl substituents having from 1 to 6 carbon atoms, fluoro-, chloro-, bromo-, and iodo-substituents. Unsubstituted p-phenylene groups are specifically preferred. Specifically preferred alkyl moieties are those which have from 1 to 4 carbon atoms. While phenylene and substituted phenylene groups are preferred linking groups, other functionally equivalent divalent aryl groups, such as naphthalene groups, can be employed.

In one form $R^2$ represents an unsubstituted benzyl group or substituted equivalents thereof, such as alkyl, halo-, or alkoxy-substituted benzyl groups. In the preferred form no more than 6 and, most preferably, no more than 4 carbon atoms are contributed by substituents to the benzyl group. Substituents to the benzyl group are preferably para-substituents. Specifically preferred benzyl substituents are formed by unsubstituted, 4-halo-substituted, 4-methoxy-substituted, and 4-methyl-substituted benzyl groups. In another specifically preferred form $R^2$ represents hydrogen.

Referring again to formula (II), it is apparent that $R^3$ and $R^4$ can independently take a variety of forms. One specifically contemplated form can be an alkyl group or a substituted alkyl group, such as a haloalkyl group, alkoxyalkyl group, phenylalkyl group, or equivalent group, having a total of up to 18, preferably up to 12, carbon atoms. Specifically $R^3$ and/or $R^4$ can take the form of a methyl, ethyl, propyl, butyl, pentyl, hexyl, heptyl, octyl, nonyl, decyl or higher homologue group having up to 18 carbon atoms; a fluoro-, chloro-, bromo-, or iodo-substituted derivative thereof; a methoxy, ethoxy, propoxy, butoxy or higher homologue alkoxy-substituted derivative thereof, wherein the total number of carbon atoms are necessarily at least 2 up to 18; and a phenyl-substituted derivative thereof, wherein the total number of carbon atoms is necessarily at least 7, as in the case of benzyl, up to about 18. In a specific preferred form $R^3$ and/or $R^4$ can take the form of an alkyl or phenylalkyl substituent, wherein the alkyl moieties are in each instance from 1 to 6 carbon atoms.

In addition to the acyclic aliphatic and aromatic forms discussed above, it is also contemplated that $R^3$ and or $R^4$ can taken the form of a cyclic aliphatic substituent, such as a cycloalkyl substituent having from 3 to 10 carbon atoms. The use of cyclopropyl, cyclobutyl, cyclopentyl, cyclohexyl, methylcyclohexyl, cyclooctyl, cyclodecyl and bridged ring variations, such as, bornyl and isobornyl groups, is contemplated. Cyclohexyl is a preferred cycloalkyl substituent. The use of alkoxy, cyano, halogen and equivalent substituted cycloalkyl substituents is contemplated.

$R^3$ and/or $R^4$ can also be an aromatic substituent, such as, phenyl or naphthyl (i.e., 1-naphthyl or 2-naphthyl) or an equivalent aromatic group, e.g., 1-, 2-, or 9-anthryl, etc. As indicated in formula (II) $R^3$ and/or $R^4$ can take the form of a phenyl nucleus which is either electron-donating or electron-withdrawing, however phenyl nuclei which are highly electron-withdrawing may produce inferior nucleating agents.

The electron-withdrawing or electron-donating characteristic of a specific phenyl nucleus can be assessed by reference to Hammett sigma values. The phenyl nucleus can be assigned a Hammett sigma value-derived electron-withdrawing characteristic which is the algebraic sum of the Hammett sigma values of its substituents (i.e., those of the substituents, if any, to the phenyl group). For example, the Hammett sigma values of any substituents to the phenyl ring of the phenyl nucleus can be determined algebraically simply by determining from the literature the known Hammett sigma values for each substituent and obtaining the algebraic sum thereof. Electron-withdrawing substituents are assigned positive sigma values, while electron-donating subsituents are assigned negative sigma values.

Exemplary meta- and para-sigma values and procedures for their determination are set forth by J. Hine in Physical Organic Chemistry, second edition, page 87, published in 1962, H. VanBekkum, P. E. Verkade and B. M. Wepster in Rec. Trav. Chim., Volume 78, page 815, published in 1959, P. R. Wells in Chem. Revs., Volume 63, page 171, published in 1963, by H. H. Jaffe in Chem. Revs., Volume 53, page 191, published in 1953, by M. J. S. Dewar and P. J. Grisdale in J. Amer. Chem. Soc., Volume 84, page 3548, published in 1962, and by Barlin and Perrin in Quart. Revs., Volume 20, page 75 et seq, published in 1966. For the purposes of this invention, ortho-substituents to the phenyl ring can be assigned to the published para-sigma values.

It is preferred that $R^2$ and/or $R^3$ be a phenyl nucleus having a Hammett sigma value-derived electron-withdrawing characteristic less positive than +0.50. It is specifically contemplated that $R^2$ and or $R^3$ be chosen from among phenyl nuclei having cyano, fluoro-, chloro-, bromo-, iodo-, alkyl groups having from 1 to 6 carbon atoms, and alkoxy groups having from 1 to 6 carbon atoms, as phenyl ring substituents. Phenyl ring substituents are preferred in the para- or 4-ring position.

Rather than being independently chosen $R^2$ and $R^3$ can together form, along with the 3-position nitrogen atom of the thiourea, a heterocyclic nucleus forming a 5- or 6-membered ring. The ring atoms can be chosen from among nitrogen, carbon, oxygen, sulfur and selenium atoms. The ring necessarily contains at least one nitrogen atom. Exemplary rings include morpholino, piperidino, pyrrolidinyl, pyrrolinyl, thiomorpholino, thiazolidinyl, 4-thiazolinyl, selenazolidinyl, 4-selenazolinyl, imidazolidinyl, imidazolinyl, oxazolidinyl and 4-oxazolinyl rings. Specifically preferred rings are saturated or otherwise constructed to avoid electron withdrawal from the 3-position nitrogen atom.

Acylhydrazinophenylthiourea nucleating agents and their synthesis are more specifically disclosed in Leone U.S. Pat. Nos. 4,030,925 and 4,276,364, here incorporated by reference. Variants of the acylhydrazinophenylthiourea nucleating agents described above are disclosed in von Konig U.S. Pat. No. 4,139,387 and Adachi et al. U.K. Patent Application 2,012,443A.

Another preferred class of phenylhydrazide nucleating agents are N-(acylhydrazinophenyl)thioamide nucleating agents, such as those indicated by formula (III) below:

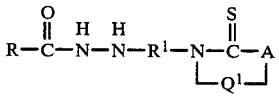

(III)

wherein

R and $R^1$ are as defined in formula (II);

A is $=N-R^2$, —S— or —O—;

$Q^1$ represents the atoms necessary to complete a five-membered heterocyclic nucleus;

$R^2$ is independently chosen from hydrogen, phenyl, alkyl, alkylphenyl, and phenylalkyl; and the alkyl moieties in each instance include from 1 to 6 carbon atoms.

These compounds embrace those having a five-membered heterocyclic thioamide nucleus, such as a 4-thiazoline-2-thione, thiazolidine-2-thione, 4-oxazoline-2-thione, oxazolidine-2-thione, 2-pyrazoline-5-thione, pyrazolidine-5-thione, indoline-2-thione, and 4-imidazoline-2-thione, etc. A specifically preferred subclass of heterocyclic thioamide nuclei is formed when $Q^1$ is as indicated in formula (IV)

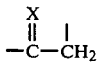

(IV)

wherein

X is =S or =O.

Specifically preferred illustrations of such values of $Q^1$ are 2-thiohydantoin, rhodanine, isorhodanine, and 2-thio-2,4-oxazolidinedione nuclei. It is believed that some six-membered nuclei, such as thiobarbituric acid, may be equivalent to five-membered nuclei embraced within formula (III).

Another specifically preferred subclass of heterocyclic thioamide nuclei is formed when $Q^1$ is as indicated in formula (V)

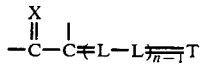

(V)

wherein

L is a methine group;

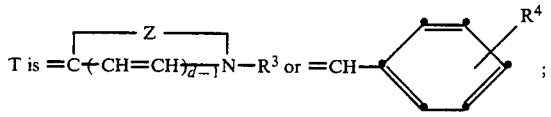

$R^3$ is an alkyl substituent;

$R^4$ is hydrogen; an alkyl,

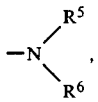

or an alkoxy substituent;

Z represents the nonmetallic atoms necessary to complete a basic heterocyclic nucleus of the type found in cyanine dyes;

n and d are independently chosen from the integers 1 and 2;

$R^5$ and $R^6$ are independently chosen fromm hydrogen, phenyl, alkyl, alkylphenyl, and phenylalkyl; and the alkyl moieties in each instance include from 1 to 6 carbon atoms.

The formula (V) values for $Q^1$ provide a heterocyclic thioamide nucleus corresponding to a methine substituted form of the nuclei present above in formula (IV) values for $Q^1$. In a specifically preferred form the heterocyclic thioamide nucleus is preferably a methine substituted 2-thiohydantoin, rhodanine, isorhodanine, or 2-thio-2,4-oxazolidinedione nucleus. The heterocyclic thioamine nucleus of formula (V) is directly, or through an intermediate methine linkage, substituted with a basic heterocyclic nucleus of the type employed in cyanine dyes of a substituted benzylidene nuclues. Z preferably represents the nonmetallic atoms necessary to complete a basic 5- or 6-membered heterocyclic nucleus of the type found in cyanine dyes having ring-forming atoms chosen from the class consisting of carbon, nitrogen, oxygen, sulfur, and selenium.

N-(acylhydrazinophenyl)thioamine nucleating agents and their synthesis are more specifically disclosed in Leone et al U.S. Pat. No. 4,080,207.

Still another preferred class of phenylhydrazide nucleating agents are triazole-substituted phenylhydrazide nucleating agents. More specifically, preferred triazole-substituted phenylhydrazide nucleating agents are those represented by formula VI below:

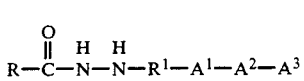

(VI)

wherein

R and $R^1$ are as defined in formula (II);

$A^1$ is alkylene or oxalkylene;

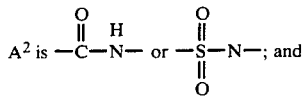

$A^3$ is a triazolyl or benzotriazolyl nucleus;

the alkyl and alkylene moieties in each instance including from 1 to 6 carbon atoms.

Still more specifically preferred triazole-substituted phenylhydrazide nucleating agents are those represented by formula (VII) below:

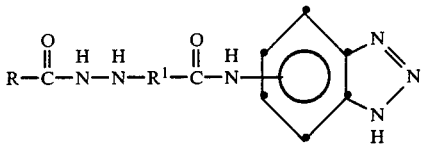

(VII)

wherein

R is hydrogen or methyl;

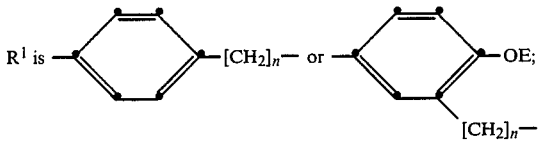

n is an integer of 1 to 4;

E is alkyl of from 1 to 4 carbon atoms.

Triazole-substituted phenylhydrazide nucleating agents and their synthesis are disclosed by Sidhu et al U.S. Pat. No. 4,278,748, here incorporated by reference. Comparable nucleating agents having a somewhat broader range of adsorption promoting groups are disclosed in corresponding U.K. Patent Application 2,011,391A.

The aromatic hydrazides represented by formulas (II), (III), and (VI) each contain adsorption promoting substituents. In many instances it is preferred to employ in combination with these aromatic hydrazides additional hydrazides or hydrazones which do not contain substituents specifically intended to promote adsorption to silver halide grain surfaces. Such hydrazides or hydrazones, however, often contain substituents to reduce their mobility when incorporated in photographic elements. These hydrazide or hydrazones can be employed as the sole nucleating agent, if desired.

Such hydazides and hydrazones include those represented by formula (VIII) and (IX) below:

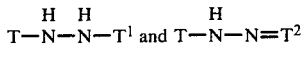

(VIII) (IX)

wherein T is an aryl radical, including a substituted aryl radical, $T^1$ is an acyl radical, and $T^2$ is an alkylidene radical and including substituted alkylidene radicals. Typical aryl radicals for the substituent T have the formula M-$T^3$—, wherein $T^3$ is an aryl radical (such as, phenyl, 1-naphthyl, 2-naphthyl, etc.) and M can be such substituents as hydrogen, hydroxy, amino, alkyl, alkylamino, arylamino, heterocyclic amino (amino containing a heterocyclic moiety), alkoxy, aryloxy, acyloxy, arylcarbonamido, alkylcarbonamido, heterocyclic carbonamido (carbonamido containing a heterocyclic moiety), arylsulfonamido, alkylsulfonamido, and heterocyclic sulfonamido (sulfonamido containing a heterocyclic moiety). Typical acyl radicals for the substituent $T^1$ have the formula

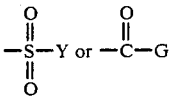

wherein Y can be such substituents as alkyl, aryl, and heterocyclic radicals, G can represent a hydrogen atom or the same substituent as Y as well as radicals having the formula

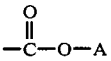

to form oxalyl radicals wherein A is an alkyl, aryl, or a heterocyclic radical. Typical alkylidene radicals for the substituent $T^2$ have the formula =CH—D wherein D can be a hydrogen atom or such radicals as alkyl, aryl, and heterocyclic radicals. Typical aryl substituents for the above-described hydrazides and hydrazones include phenyl, naphthyl, diphenyl, and the like. Typical heterocyclic substituents for the above-described hydrazides and hydrazones include azoles, azines, furan, thiophene, quinoline, pyrazole, and the like. Typical alkyl (or alkylidene) substituents for the above-described hydrazides and hydrazones have 1 to 22 carbon atoms including methyl, ethyl, isopropyl, n-propyl, isobutyl, n-butyl, t-butyl, amyl, n-octyl, n-decyl, n-dodecyl, n-octadecyl, n-eicosyl, and n-docosyl.

The hydrazides and hydrazones represented by formulas (VIII) and (IX) as well as their synthesis are disclosed by Whitmore U.S. Pat. No. 3,227,552, here incorporated by reference.

A secondary preferred general class of nucleating agents for use in the practice of this invention are N-substituted cycloammonium quaternary salts. A particularly preferred species of such nucleating agents is represented by formula (X) below:

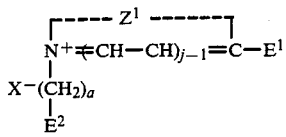

(X)

wherein $Z^1$ represents the atoms necessary to complete a heterocyclic nucleus containing a heterocyclic ring of to 6 atoms including the quaternary nitrogen atoms, with the additional atoms of said heterocyclic ring being selected from carbon, nitrogen, oxygen, sulfur, and selenium;

j represents a positive integer of from 1 to 2;

a represents a positive integer of from 2 to 6;

$X^-$ represents an acid anion;

$E^2$ represents a member selected from (a) a formyl radical, (b) a radical having the formula

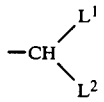

wherein each of $L^1$ and $L^2$, when taken alone, represents a member selected from an alkoxy radical and an alkylthio radical, and $L^1$ and $L^2$, when taken together, represent the atoms necessary to complete a cyclic radical selected from cyclic oxyacetals and cyclic thioacetals having from 5 to 6 atoms in the heterocyclic acetal ring, and (c) a 1-hydrazonoalky radical; and $E^1$ represents either a hydrogen atom, an alkyl radical, an aralkyl radical, an alkylthio radical, or an aryl radical such as phenyl and naphthyl, and including substituted aryl radicals.

The N-substituted cycloammonium quaternary salt nucleating agents of formula (X) and their synthesis are disclosed by Lincoln and Heseltine U.S. Pat. Nos. 3,615,615 and 3,759,901. In a variant form $E^1$ can be a divalent alkylene group of from 2 to 4 carbon atoms joining two substituted heterocyclic nuclei as shown in formula (X). Such nucleating agents and their synthesis are disclosed by Kurtz and Harbison U.S. Pat. No. 3,734,738.

The substituent to the quaternized nitrogen atom of the heterocyclic ring can, in another variant form, itself form a fused ring with the heterocyclic ring. Such nucleating agents are illustrated by dihydroaromatic quaternary salts comprising a 1,2-dihydroaromatic heterocyclic nucleus including a quaternary nitrogen atom. Particularly advantageous 1,2-dihydroaromatic nuclei include such nuclei as a 1,2-dihydropyridinium nucleus. Especially preferred dihydroaromatic quaternary salt nucleating agents include those represented by formula (XI) below:

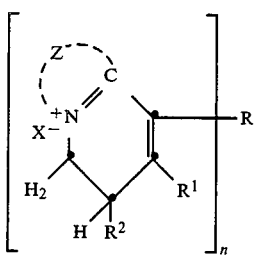

(XI)

wherein

Z represents the nonmetallic atoms necessary to complete a heterocyclic nucleus containing a heterocyclic ring of from 5 to 6 atoms including the quaternary nitrogen atom, with the additional atoms of said heterocyclic ring being selected from either carbon, nitrogen, oxygen, sulfur, or selenium;

n represents a positive integer having a value of from 1 to 2;

when n is 1, R represents a member selected from the group consisting of a hydrogen atom, an alkyl radical, an alkoxy radical, an aryl radical, an aryloxy radical, and a carbamido radical and, when n is 2, R represents an alkylene radical having from 1 to 4 carbon atoms;

each of $R^1$ and $R^2$ represents a member selected from the group consisting of a hydrogen atom, an alkyl radical, and an aryl radical; and $X^-$ represents an anion.

Dihydroaromatic quaternary salt nucleating agents and their synthesis are disclosed by Kurtz and Heseltine U.S. Pat. No. 3,718,494, here incorporated by reference.

A specifically preferred class of N-substituted cycloammonium quaternary salt nucleating agents are those which include one or more alkynyl substituents. Such nucleating agents include compounds within the generic structural definition set forth in formula (XII) below;

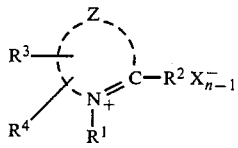

(XII)

wherein Z represents an atomic group necessary for forming a 5- or 6-membered heterocyclic nucleus, $R^1$ represents an aliphatic group, $R^2$ represents a hydrogen atom or an aliphatic group, $R^3$ and $R^4$, which may be the same or different, each represents a hydrogen atom, a halogen atom, an aliphatic group, an alkoxy group, a hydroxy group, or an aromatic group, at least one of $R^1$, $R^2$, $R^3$ and $R^4$ being a propargyl group, a butynyl group, or a substituent containing a propargyl or butynyl group, $X^-$ represents an anion, n is 1 or 2, with n being 1 when the compound forms an inner salt.

Such alkynyl-substituted cycloammonium quaternary salt nucleating agents and their synthesis are illustrated by Adachi et al U.S. Pat. No. 4,115,122, here incorporated by reference.

The specific choice of nucleating agents can be influenced by a variety of factors. The nucleating agents of Leone cited above are particularly preferred for many applications, since they are effective at very low concentrations. Minimum concentrations as low as 0.1 mg of nucleating agent per mole of silver, preferably at least 0.5 mg per silver mole, and optimally at least 1 mg per silver mole are disclosed by Leone. The nucleating agents of Leone are particularly advantageous in reducing speed loss and in some instances permitting speed gain with increasing processing temperatures. When the nucleating agents of Leone are employed in combination with those of Whitmore speed variations as a function of temperature of processing can be minimized.

The aromatic hydrazide nucleating agents are generally preferred for use in photographic elements intended to be processed at comparatively high levels of pH, typically above 13. The alkynyl-substituted cycloammonium quaternary salt nucleating agents are particularly useful for processing at a pH of 13 or less. Adachi et al teaches these nucleating agents to be useful in processing within the pH range of from 10 to 13, preferably 11 to 12.5.

In addition to the nucleating agents described above additional nucleating agents have been identified which are useful in processing at pH levels in the range of from about 10 to 13. An N-substituted cycloammonium quaternary salt nucleating agent which can contain one or more alkynyl substituents is illustrative of one class of nucleating agents useful in processing below pH 13. Such nucleating agents are illustrated by formula (XIII) below:

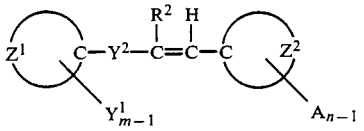

(XIII)

wherein $Z^1$ represents the atoms completing an aromatic carbocyclic nucleus of from 6 to 10 carbon atoms;

$Y^1$ and $Y^2$ are independently selected from among a divalent oxygen atom, a divalent sulfur atom, and $$-\overset{|}{N}-R^3;$$

$Z^2$ represents the atoms completing a heterocyclic nucleus of the type found in cyanine dyes;

A is an adsorption promoting moiety;

m and n are 1 and 2; and $R^1$, $R^2$, and $R^3$ are independently chosen from the group consisting of hydrogen, alkyl, aryl, alkaryl, and aralkyl and $R^1$ and $R^3$ are additionally independently chosen from the group consisting of acyl, alkenyl, and alkynyl, the aliphatic moieties containing up to 5 carbon atoms and the aromatic moieties containing 6 to 10 carbon atoms. A preferred processing pH when these nucleating agents are employed is in the range of from 10.2 to 12.0.

Nucleating agents of the type represented by formula (XIII) and their synthesis are disclosed by Baralle et al U.S. Pat. No. 4,306,016, here incorporated by reference.

Another class of nucleating agents effective in the pH range of from 10 to 13, preferably 10.2 to 12, are dihydrospiropyran bis-condensation products of salicylic aldehyde and at least one heterocyclic ammonium salt. In a preferred form such nucleating agents are represented by formula (XIV) below:

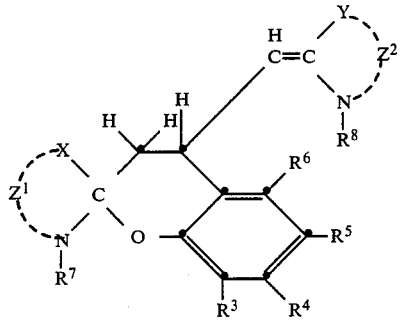

(XIV)

wherein

X and Y each independently represent a sulfur atom, a selenium atom or a $-C(R^1R^2)-$ radical, $R^1$ and $R^2$ independently represent lower alkyl of from 1 to carbon atoms or together represent an alkylene radical of 4 or 5 carbon atoms, $R^3$, $R^4$, $R^5$ and $R^6$ each represent hydrogen, a hydroxy radical or a lower alkyl or alkoxy radical of from 1 to 5 carbon atoms, $Z^1$ and $Z^2$ each represents the nonmetallic atoms completing a nitrogen-containing heterocyclic nucleus of the type found in cyanine dyes and $R^7$ and $R^8$ each represent a ring nitrogen substituent of the type found in cyanine dyes.

$Z^1$ and $Z^2$ is a preferred form each completes a 5- or 6-membered ring, preferably fused with at least one benzene ring, containing in the ring structure carbon atoms, a single nitrogen atom and, optionally, a sulfur or selenium atom.

Nucleating agents of the type represented by formula (XIV) and their synthesis are disclosed by Baralle et al U.S. Pat. No. 4,306,017, here incorporated by reference.

Still another class of nucleating agents effective in the pH range of from 10 to 13, preferably 10.2 to 12, are diphenylmethane nucleating agents. Such nucleating agents are illustrated by formula (XV) below:

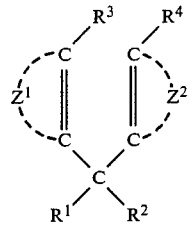

(XV)

wherein $Z^1$ and $Z^2$ represent the atoms completing a phenyl nucleus;

$R^1$ represents hydrogen or alkyl of from 1 to 16 carbon atoms; and $R^2$, $R^3$, and $R^4$ are independently selected from among hydrogen, halogen, alkyl, hydroxy, alkoxy, aryl, alkaryl, and aralkyl or $R^3$ and $R^4$ together form a covalent bond, a divalent chalcogen linkage, or

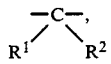

wherein each alkyl moiety contains from 1 to 6 carbon atoms and each aryl moiety contains 6 to 10 carbon atoms.

Nucleating agents of the type represented by formula (XV) and their synthesis are disclosed by Baralle et al U.S. Pat. No. 4,315,986, here incorporated by reference.

Instead of being incorporated in the photographic element during manufacture, nucleating agents can alternatively or additionally be incorporated in the developer solution. Hydrazine ($H_2N—NH_2$) is an effective nucleating agent which can be incorporated in the developing solution. As an alternative to the use of hydrazine, any of a wide variety of water-soluble hydrazine derivatives can be added to the developing solution. Preferred hydrazine derivatives for use in developing solutions include organic hydrazine compounds of the formula:

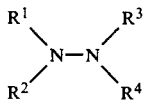

(XVI)

wherein $R^1$ is an organic radical and each of $R^2$, $R^3$ and $R^4$ is a hydrogen atom or an organic radical. Organic radicals represented by $R^1$, $R^2$, $R^3$ and $R^4$ include hydrocarbyl groups such a an alkyl group, an aryl group, an aralkyl group, an alkaryl group, and an alicylic group, as well as hydrocarbyl groups substituted with substituents such as alkoxy groups, carboxy groups, sulfonamido groups, and halogen atoms.

Particularly preferred hydrazine derivatives for incorporation in developing solutions include alkylsulfonamidoaryl hydrazines such as p-(methylsulfonamido) phenylhydrazine and alkylsulfonamidoalkyl aryl hydrazines such as p-(methylsulfonamidomethyl) phenylhydrazine.

The hydrazine and hydrazide derivatives described above are disclosed in Smith et al U.S. Pat. No. 2,410,690, Stauffer et al U.S. Pat. No. 2,419,975, and Hunsberger U.S. Pat. No. 2,892,715. The preferred hydrazines for incorporation in developers are described in Nothnagle U.S. Pat. No. 4,269,929. Another preferred class of nucleating agents that can be incorporated in the developer correspond to formula (I) above, but with the moiety M capable of restricting mobility absent. Nucleating agents of this type are disclosed in Okutsu et al U.S. Pat. No. 4,221,857 and Takada et al U.S. Pat. No. 4,224,401.

Silver Imaging

Once core-shell emulsions have been generated by precipitation procedures, washed, and sensitized, as described above, their preparation can be completed by the optional incorporation of nucleating agents, described above, and conventional photographic addenda, and they can be usefully applied to photographic applications requiring a silver image to be produced—e.g., conventional black-and-white photography.

The core-shell emulsion is comprised of a dispersing medium in which the core-shell grains are dispersed. The dispersing medium of the core-shell emulsion layers and other layers of the photographic elements can contain various colloids alone or in combination as vehicles (which include both binders and peptizers). Preferred peptizers are hydrophilic colloids, which can be employed alone or in combination with hydrophobic materials. Preferred peptizers are gelatin—e.g., alkali-treated gelatin (cattle bone or hide gelatin) and acid-treated gelatin (pigskin gelatin) and gelatin derivatives—e.g., acetylated gelatin, phthalated gelatin, and the like. Useful vehicles are illustrated by those disclosed in Research Disclosure, Item 176643, cited above, Section IX, here incorporated by reference. The layers of the photographic elements containing cross-linkable colloids, particularly the gelatin-containing layers, can be hardened by various organic and inorganic hardeners, as illustrated by Research Disclosure, Item 17643, cited above, Section X.

Instability which decreases maximum density in direct-positive emulsion coatings can be protected against by incorporation of stabilizers, antifoggants, antikinking agents, latent image stabilizers and similar addenda in the emulsion and contiguous layers prior to coating. A variety of such addenda are disclosed in Research Disclosure, Item 17643, cited above, Section VI. Many of the antifoggants which are ineffective in emulsions can also be used in developers and can be classified under a few general headings, as illustrated by C. E. K. Mees, The Theory of the Photographic Process, 2nd Ed., Macmillan, 1954, pp. 677–680.

In some applications improved results can be obtained when the direct-positive emulsions are processed in the presence of certain antifoggants, as disclosed in Stauffer U.S. Pat. No. 2,497,917, here incorporated by reference. Typical useful antifoggants of this type include benzotriazoles, such as benzotriazole, 5-methylbenzotriazole, and 5-ethylbenzotriazole; benzimidazoles such as 5-nitrobenzimidazole; benzothiazoles such as 5-nitrobenzothiazole and 5-methylbenzothiazole; heterocyclic thiones such as 1-methyl-2-tetrazoline-5-thione; triazines such as 2,4-dimethylamino-6-chloro-5-triazine; benzoxazoles such as ethylbenzoxazole; and pyrroles such as 2,5-dimethylpyrrole.

In certain embodiments, good results are obtained when the elements are processed in the presence of high levels of the antifoggants mentioned above. When antifoggants such as benzotriazoles are used, good results can be obtaned when the processing solution contains up to 5 grams per liter and preferably 1 to 3 grams per liter; when they are incorporated in the photographic element, concentrations of up to 1,000 mg per mole of silver and preferably concentrations of 100 to 500 mg per mole of silver are employed.

In addition to sensitizers, hardeners, and antifoggants and stabilizers, a variety of other conventional photographic addenda can be present. The specific choice of addenda depends upon the exact nature of the photographic application and is well within the capability of the art. A variety of useful addenda are disclosed in Research Disclosure, Item 17643, cited above, here incorporated by reference. Optical brighteners can be introduced, as disclosed by Item 17643 at Section V. Absorbing and scattering materials can be employed in the emulsions of the invention and in separate layers of the photographic elements, as described in Section VIII. Coating aids, as described in Section XI, and plasticizers and lubricants, as described in Section XII, can be present. Antistatic layers, as described in Section XIII, can be present. Methods of addition of addenda are described in Section XIV. Matting agents can be incorporated, as described in Section XVI. Developing agents and development modifiers can, if desired, be incorporated, as described in Sections XX and XXI. The emulsions of the invention, as well as other, conventional silver halide emulsion layers, interlayers, overcoats, and subbing layers, if any, present in the photographic elements can be coated and dried as described in Item 17643, Section XV.

The layers of the photographic elements can be coated on a variety of supports. Typical photographic supports include polymeric film, wood fiber—e.g., paper, metallic sheet and foil, glass and ceramic supporting elements provided with one or more subbing layers to enhance the adhesive, antistatic, dimensional, abrasive, hardness, frictional, antihalation and/or other properties of the support surface. Suitable photographic supports are illustrated by Research Disclosure, Item 17643, cited above, Section XVII, here incorporated by reference.

Although the emulsion layer or layers are typically coated as continuous layers on supports having opposed planar major surfaces, this need not be the case. The emulsion layers can be coated as laterally displaced layer segments on a planar support surface. When the emulsion layer or layers are segmented, it is preferred to employ a microcellular support. Useful microcellular supports are disclosed by Whitmore Patent Cooperation Treaty published application WO80/01614, published Aug. 7, 1980, (Belgian Patent 881,513, Aug. 1, 1980, corresponding), here incorporated by reference. Microcells can range from 1 to 200 microns in width and up to 1000 microns in depth. It is generally preferred that the microcells be at least 4 microns in width and less than 200 microns in depth, with optimum dimensions being about 10 to 100 microns in width and depth for ordinary black-and-white imaging applications—particularly where the photographic image is intended to be enlarged.

The photographic elements of the present invention can be imagewise exposed in any conventional manner. Attention is directed to Research Disclosure Item 17643, cited above, Section XVIII, here incororated by reference. The present invention is particularly advantageous when imagewise exposure is undertaken with electromagnetic radiation within the region of the spectrum in which the spectral sensitizers present exhibit absorption maxima. When the photographic elements are intended to record blue, green, red or infrared exposures, spectral sensitizer absorbing in the blue, green, red, or infrared portion of the spectrum is present. As noted above, for black-and-white imaging applications it is preferred that the photographic elements be orthochromatically or panchromatically sensitized to permit light to extend sensitivity within the visible spectrum. Radiant energy employed for exposure can be either noncoherent random phase) or coherent (in phase), produced by lasers. Imagewise exposures at ambient, elevated or reduced temperatures and/or pressures, including high or low intensity exposures, continuous or intermittent exposures, exposure times ranging from minutes to relatively short durations in the millisecond to microsecond range, can be employed within the useful response ranges determined by conventional sensitometric techniques, as illustrated by T. H. James, The Theory of the Photographic Process, 4th Ed., Macmillan, 1977, Chapters 4, 6, 17, 18, and 23.

The light-sensitive silver halide contained in the photographic elements can be processed following exposure to form a visible image by associating the silver halide with an aqueous alkaline medium in the presence of a developing agent contained in the medium or the element. Processing formulations and techniques are described in L. F. Mason, Photographic Processing Chemistry, Focal Press, London, 1966; Processing Chemicals and Formulas. Publication J-1, Eastman Kodak Company, 1973; Photo-Lab Index, Morgan and Morgan, Inc., Dobbs Ferry, New York, 1977, and Neblette's Handbook of Photography and Reprography Materials, Processes and Systems, VanNostrand Reinhold Company, 7th Ed., 1977.

Included among the processing methods are web processing, as illustrated by Tregillus et al U.S. Pat. No. 3,179,517; stabilization processing, as illustrated by Herz et al U.S. Pat. No. 3,220,839, Cole U.S. Pat. No. 3,615,511, Shipton et al. U.K. Patent 1,258,906 and Haist et al. U.S. Pat. No. 3,647,453; monobath processing as described in Haist, Monobath Manual, Morgan and Morgan, Inc., 1966, Schuler U.S. Pat. No. 3,240,603, Haist et al. U.S. Pat. No. 3,615,513 and 3,628,955 and Price U.S. Pat. No. 3,723,126; infectious development, as illustrated by Milton U.S. Pat. Nos. 3,294,537, 3,600,174, 3,615,519 and 3,615,524, Whiteley U.S. Pat. No. 3,516,830, Drago U.S. Pat. No. 3,615,488, Salesin et al. U.S. Pat. No. 3,625,689, Illingsworth U.S. Pat. No. 3,632,340, Salesin U.K. Patent 1,273,030 and U.S. Pat. No. 3,708,303; hardening development, as illustrated by Allen et al U.S. Pat. No. 3,232,761; roller transport processing, as illustrated by Russell et al U.S. Pat. Nos. 3,025,779 and 3,515,556, Masseth U.S. Pat. No. 3,573,914, Taber et al U.S. Pat. No. 3,647,459 and Rees et al. U.K. Patent 1,269,268; alkaline vapor processing, as illustrated by Product Licensing Index, Vol. 97, May 1972, Item 9711, Goffe et al U.S. Pat. No. 3,816,136 and King U.S. Pat. No. 3,985,564; metal ion development as illustrated by Price, Photographic Science and Engineering, Vol. 19, Number 5, 1975, pp. 283–287 and Vought Research Disclosure, Vol. 150, October 1976, Item 15034; and surface application processing, as illustrated by Kitze U.S. Pat. No. 3,418,132.

Although development is preferably undertaken in the presence of a nucleating agent, as described above, giving the photographic elements an over-all light exposure either immediately prior to or, preferably, during development can be undertaken as an alternative. When an over-all flash exposure is used, it can be of high intensity and short duration or of lower intensity for a longer duration.

The silver halide developers employed in processing are surface developers. It is understood that the term "surface developer" encompasses those developers which will reveal the surface latent image centers on a silver halide grain, but will not reveal substantial internal latent image centers in an internal latent image-forming emulsion under the conditions generally used to develop a surface-sensitive silver halide emulsion. The surface developers can generally utilize any of the silver halide developing agents or reducing agents, but the developing bath or composition is generally substantially free of a silver halide solvent (such as water-soluble thiocyanates, water-soluble thioethers, thiosulfates, and ammonia) which will disrupt or dissolve the grain to reveal substantial internal image. Low amounts of excess halide are sometimes desirable in the developer or incorporated in the emulsion as halide-releasing compounds, but high amounts of iodide or iodide-releasing compounds are generally avoided to prevent substantial disruption of the grain.

Typical silver halide developing agents which can be used in the developing compositions of this invention include hydroquinones, catechols, aminophenols, 3-pyrazolidinones, ascorbic acid and its derivatives, reductones, phenylenediamines, or combinations thereof. The developing agents can be incorporated in the photographic elements wherein they are brought into contact with the silver halide after imagewise exposure; however, in certain embodiments they are preferably employed in the developing bath.

Once a silver image has been formed in the photographic element, it is conventional practice to fix the undeveloped silver halide. The high aspect ratio tabular grain emulsions of the present invention are particularly advantageous in allowing fixing to be accomplished in a shorter time period. This allows processing to be accelerated.

Dye Imaging

The photographic elements and the techniques described above for producing silver images can be readily adapted to provide a colored image through the use of dyes. In perhaps the simplest approach to obtaining a projectable color image a conventional dye can be incorporated in the support of the photographic element, and silver image formation undertaken as described above. In areas where a silver image is formed the element is rendered substantially incapable of transmitting light therethrough, and in the remaining areas light is transmitted corresponding in color to the color of the support. In this way a colored image can be readily formed. The same effect can also be achieved by using a separate dye filter layer or element with a transparent support element.

The silver halide photographic elements can be used to form dye images therein through the selective destruction or formation of dyes. The photographic elements can produce dye images through the selective destruction of dyes or dye precursors, such as silver-dye-bleach processes, as illustrated by A. The photographic elements described above for forming silver images can be used to form dye images by employing developers containing dye image formers, such as color couplers. In this form the developer contains a color-developing agnet (e.g., a primary aromatic amine) which in its oxidized form is capable of reacting with the coupler coupling) to form the image dye. The dye-forming couplers are preferably incorporated in the photographic elements. The dye-forming couplers can be incorporated in different amounts to achieve differing photographic effects. For example, U.K. Patent 923,045 and Kumai et al U.S. Pat. No. 3,843,369 teach limiting the concentration of coupler in relation to the silver coverage to less than normally employed amounts in faster and intermediate speed emulsion layers.

The dye-forming couplers are commonly chosen to form subtractive primary (i.e., yellow, magenta and cyan) image dyes and are nondiffusible, colorless couplers, such as two and four equivalent couplers of the open chain ketomethylene, pryazolone, pyrazolotriazole, pyrazolobenzimidazole, phenol and naphthol type hydrophobically ballasted for incorporation in high-boiling organic (coupler) solvents. Dye-forming couplers of differing reaction rates in single or separate layers can be employed to achieve desired effects for specific photographic applications.

The dye-forming couplers upon coupling can release photographically useful fragments, such as development inhibitors or accelerators, bleach accelerators, developing agents, silver halide solvents, toners, hardeners, fogging agents, antifoggants, competing couplers, chemical or spectral sensitizers and desensitizers. Development inhibitor-releasing (DIR) couplers are specifically contemplated. Silver halide emulsions which are relatively light insensitive, such as Lippmann emulsions, have been utilized as interlayers and overcoat layers to prevent or control the migration of development inhibitor fragments as described in Shiba et al U.S. Pat. No. 3,892,572. The photographic elements can incorporate colored dye-forming couplers, such as those employed to form integral masks for negative color images. The photographic elments can include image dye stabilizers. The various couplers and the image dye stabilizer are well known in the art and are illustrated by the various patents cited in Research Disclosure, Item 17643, cited above, Section VII, here incorporated by reference.

Dye images can be formed or amplified by processes which employ in combination with a dye-image-generating reducing agent an inert transition metal ion complex oxidizing agent, as illustrated by Bissonette U.S. Pat. No. 3,748,138, 3,826,652, 3,862,842 and 3,989,526 and Travis U.S. Pat. No. 3,765,891, and/or a peroxide oxidizing agent, as illustrated by Matejec U.S. Pat. No. 3,674,490, Research Disclosure Vol. 116, December 1973, Item 11660, and Bissonette Research Disclosure, Vol. 148, August 1976, Items 14836, 14846 and 14847. The photographic elements can be particularly adapted to form dye images by such processes, as illustrated by Dunn et al U.S. Pat. No. 3,822,129, Bissonette U.S. Pat. Nos. 3,834,907 and 3,902,905, Bissonette et al U.S. Pat. No. 3,847,619 and Mowrey U.S. Pat. No. 3,904,413.

It is common practice in forming dye images in silver halide photographic elements to remove the developed silver by bleaching. Such removal can be enhanced by incorporation of a bleach accelerator or a precursor thereof in a processing solution or in a layer of the element. In some instances the amount of silver formed by development is small in relation to the amount of dye produced, particularly in dye image amplification, as described above, and silver bleaching is omitted without substantial visual effect. In still other applications the silver image is retained and the dye image is intended to enhance or supplement the density provided by the image silver. In the case of dye enhanced silver imaging it is usually preferred to form a neutral dye or a combination of dyes which together produce a neutral image. Neutral dye-forming couplers useful for this purpose are disclosed by Pupo et al Research Disclosure, Vol. 162, October 1977, Item 16226. The enhancement of silver images with dyes in photographic elements intended for thermal processing is disclosed in Research Disclosure, Vol. 173, September 1973, Item 17326, and Houle U.S. Pat. No. 4,137,079. It is also possible to form monochromatic or neutral dye images using only dyes, silver being entirely removed from the image-bearing photographic elements by bleaching and fixing, as illustrated by Marchant et al U.S. Pat. No. 3,620,747.

Multicolor Photography

The present invention can be employed to produce multicolor photographic images. Generally any conventional multicolor imaging direct-positive photographic element containing at least one core-shell silver halide emulsion layer can be improved merely by adding or substituting a core-shell emulsion according to the present invention.

Significant advantages can be realized by the application of this invention to multicolor photographic elements which produce multicolor images from combinations of subtractive primary imaging dyes. Such photographic elements are comprised of a support and typically at least a triad of superimposed silver halide emulsion layers for separately recording blue, green, and red light light exposures as yellow, magenta, and cyan dye images, respectively. Except as specifically otherwise described, the multicolor photographic elements can incorporate the features of the photographic elements described previously.

Multicolor photographic elements are often described in terms of color-forming layer units. Most commonly multicolor photographic elements contain three superimposed color-forming layer units each containing at least one silver halide emulsion layer capable of recording exposure to a different third of the spectrum and capable of producing a complementary subtractive primary dye image. Thus, blue, green, and red recording color-forming layer units are used to produce yellow, magneta, and cyan dye images, respectively. Dye imaging materials need not be present in any color-forming layer unit, but can be entirely supplied from processing solutions. When dye imaging materials are incorporated in the photographic element, they can be located in an emulsion layer or in a layer located to receive oxidized developing or electron transfer agent from an adjacent emulsion layer of the same color-forming layer unit.

To prevent migration of oxidized developing or electron transfer agents between color-forming layer units with resultant color degradation, it is common practice to employ scavengers. The scavengers can be located in the emulsion layers themselves, as taught by Yutzy et al U.S. Pat. No. 2,937,086 and/or in interlayers containing scavengers provided between adjacent color-forming layer units, as illustrated by Weissberger et al U.S. Pat. No. 2,336,327.

Although each color-forming layer unit can contain a single emulsion layer, two, three, or more emulsion layers differing in photographic speed are often incorporated in a single color-forming layer unit. Where the desired layer order arrangement does not permit multiple emulsion layers differing in speed to occur in a single color-forming layer unit, it is common practice to provide multiple (usually two or three) blue, green, and/or red recording color-forming layer units in a single photographic element.

The multicolor photographic elements of this invention can take any convenient form. Any of the six possible layer arrangements of Table 27a, p. 211, disclosed by Gorokhovskii, Spectral Studies of the Photographic Process, Focal Press, New York, can be employed. To provide a simple, specific illustration, it is contemplated to add to a conventional multicolor silver halide photographic element during its preparation one or more high aspect ratio tabular grain emulsion layers sensitized to the minus blue portion of the spectrum and positioned to receive exposing radiation prior to the remaining emulsion layers. However, in most instances it is preferred to substitute one or more minus blue recording high aspect ratio tabular grain emulsion layers according to the invention for conventional minus blue recording emulsion layers, optionally in combination with layer order arrangement modifications. The invention can be better appreciated by reference to the following preferred illustrative forms.

| Layer Order Arrangement I |
|---|
| Exposure |
| ↓ |
| B |
| IL |
| G |
| IL |
| R |

| Layer Order Arrangement II |
|---|
| Exposure |
| ↓ |
| FB |
| IL |
| FG |
| IL |
| FR |
| IL |
| SB |
| IL |
| SG |
| IL |
| SR |

| Layer Order Arrangement III |
|---|
| Exposure |
| ↓ |
| G |
| IL |
| R |
| IL |
| B |

| Layer Order Arrangement IV |
|---|
| Exposure |
| ↓ |
| FG |
| IL |
| FR |
| IL |
| SG |
| IL |
| SR |
| IL |
| B |

| Layer Order Arrangement V |
|---|
| Exposure |
| ↓ |
| FG |
| IL |
| FR |
| IL |
| FB |
| IL |
| SG |
| IL |
| SR |
| IL |
| SB |

where

B, G, and R designate blue, green, and red recording color-forming layer units, respectively, of any conventional type;

F appearing before the color-forming layer unit B, G, or R indicates that the color-forming layer unit is faster in photographic speed than at least one other color-forming layer unit which records light exposure in the same third of the spectrum in the same Layer Order Arrangement;

S appearing before the color-forming layer unit B, G, or R indicates that the color-forming layer unit is slower in photographic speed than at least one other color-forming layer unit which records light exposure in the same third of the spectrum in the same Layer Order Arrangement; and IL designates the interlayer containing a scavenger, and, if needed to protect the green and/or red recording emulsions from blue light exposure, yellow filter material. The placement of green and/or red recording emulsion layers nearer the source of exposing radiation than the blue recording emulsion layers requires the green and/or red recording emulsion layers to be relatively insensitive to blue, such as those containing (1) silver chloride and silver chlorobromide core-shell grains (note Gaspar U.S. Pat. No. 2,344,084) or (2) high aspect ratio tabular grains, as disclosed by teachings of Evans et al., cited above. Each faster or slower color-forming layer unit can differ in photographic speed from another color-forming layer unit which records light exposure in the same third of the spectrum as a result of its position in the Layer Order Arrangement, its inherent speed properties, or combination of both.

In Layer Order Arrangements I through V, the location of the support is not shown. Following customary practice, the support will in most instances be positioned farthest from the source of exposing radiation—that is, beneath the layers as shown. If the support is colorless and specularly transmissive—i.e., transparent, it can be located between the exposure source and the indicated layers. Stated more generally, the support can be located between the exposure source and any color-forming layer unit intended to record light to which the support is transparent.

Dye Image Transfer

It is possible to construct a dye image transfer film unit according to the present invention capable of producing a monochromatic transferred dye image by locating on a support a single dye-providing layer unit comprised of a core-shell silver halide emulsion layer as described above and at least one dye-image-providing material in the emulsion layer itself or in an adjacent layer of the layer unit. In addition, the dye image transfer film unit is comprised of a dye receiving layer capable of mordanting or otherwise immobilizing dye migrating to it. To produce a transferred dye image the coreshell emulsion is imagewise exposed and contacted with an alkaline processing composition with the dye receiving and emulsion layers juxtapoxed. In a particularly advantageous application for monochromatic transferred dye images a combination of dye-image-providing materials is employed to provide a neutral transferred dye image. Monochromatic transferred dye images of any hue can be produced, if desired.

Multicolor dye image transfer film units of this invention employ three dye-providing layer units: (1) a cyan-dye-providing layer unit comprised of a red-sensitive silver halide emulsion having associated therewith a cyan-dye-image-providing material, (2) a magenta-dye-providing layer unit comprised of a green-sensitive silver halide emulsion having associated therewith a magenta-dye-image-providing material, and (3) a yellow-dye-providing layer unit comprised of a blue-sensitive silver halide emulsion having associated therewith a yellow-dye-image-providing material. Each of the dye-providing layer units can contain one, two, three, or more separate silver halide emulsion layers as well as the dye-image-providing material, located in the emulsion layers or in one or more separate layers forming part of the dye-providing layer unit. Any one or combination of the emulsion layers can be core-shell silver halide emulsion layers as described above.

Depending upon the dye-image-providing material employed, it can be incorporated in the silver halide emulsion layer or in a separate layer associated with the emulsion layer. The dye-image-providing material can be any of a number known in the art, such as dye-forming couplers, dye developers, and redox dye-releasers, and the particular one employed will depend on the nature of the element or film unit and the type of image desired. Materials useful in diffusion transfer film units contain a dye moiety and a monitoring moiety. The monitoring moiety, in the presence of the alkaline processing composition and as a function of silver halide development, is responsible for a change in mobility of the dye moiety. These dye-image-providing materials can be initially mobile and rendered immobile as a function of silver halide development, as described in Rogers U.S. Pat. No. 2,983,606. Alternatively, they can be initially immobile and rendered mobile, in the presence of an alkaline processing composition, as a function of silver halide development. This latter class of materials include redox dye-releasing compounds. In such compounds, the monitoring group is a carrier from which the dye is released as a direct function of silver halide development or as an inverse function of silver halide development. Compounds which release dye as a direct function of silver halide development are referred to as negative-working release compounds, while compounds which release dye as an inverse function of silver halide development are referred to as positive-working release compounds. Since the internal latent image-forming emulsions of this invention develop in unexposed areas in the presence of a nucleating agent and a surface developer, positive transferred dye images are produced using negative-working release compounds, and the latter are therefore preferred for use in the practice of this invention.

A preferred class of negative-working release compounds are the ortho or para sulfonamidophenols and naphthols described in Fleckenstein U.S. Pat. No. 4,054,312, Koyama et al U.S. Pat. No. 4,055,428, and Fleckenstein et al U.S. Pat. No. 4,076,529. In these compounds the dye moiety is attached to a sulfonamido group which is ortho or para to the phenolic hydroxy group and is released by hydrolysis after oxidation of the sulfonamido compound during development.

Another preferred class of negative-working release compounds are ballasted dye-forming (chromogenic) or nondye-forming nonchromogenic) couplers having a mobile dye attached to a coupling-off site. Upon coupling with an oxidized color developing agent, such as a para-phenylenediamine, the mobile dye is displaced so that it can transfer to a receiver. The use of such negative-working dye image providing compounds is illustrated by Whitmore et al U.S. Pat. No. 3,227,550, Whitmore U.S. Pat. No. 3,227,552, and Fujiwhara et al U.K. Patent No. 1,445,797, the disclosures of which are here incorporated by reference.

Since the silver halide emulsions employed in the image transfer film units of the present invention are positive-working, the use of positive-working release compounds will produce negative transferred dye images. Useful positive-working release compounds are nitrobenzene and quinone compounds described in Chasman et al U.S. Pat. No. 4,139,379, the hydroquinones described in Fields et al U.S. Pat. No. 3,980,479 and the benzisoxazolone compounds described in Hinshaw et al U.S. Pat. No. 4,199,354.

Further details regarding the above release compounds, the manner in which they function, and the procedures by which they can be prepared are contained in the patents referred to above, the disclosures of which are incorporated herein by reference.

Any material can be employed as the dye receiving layer in the film units of this invention as long as it will mordant or otherwise immobilize the dye which diffuses to it. The optimum material chosen will, of course, depend upon the specific dye or dyes to be mordanted. The dye receiving layer can also contain ultraviolet absorbers to protect the dye image from fading due to ultraviolet light, brighteners, and similar materials to protect or enhance the dye image. A polyvalent metal, preferably immobilized by association with a polymer, can be placed in or adjacent in the receiving layer to chelate the transferred image dye, as taught by Archie et al U.S. Pat. No. 4,239,849 and Myers et al U.S. Pat. No. 4,241,163. Useful dye receiving layers and materials for their fabrication are disclosed in Research Disclosure, Item 15162, cited above, and Morgan et al European Patent Publication 14,584.

The alkaline processing composition employed in the dye image transfer film units can be an aqueous solution of an alkaline material, such as an alkali metal hydroxide or carbonate (e.g., sodium hydroxide or sodium carbonate) or an amine (e.g., diethylamine). Preferably the alkaline composition has a pH in excess of 11. Suitable materials for use in such compositions are disclosed in Research Disclosure, Item 15162, cited above.

A developing agent is preferably contained in the alkaline processing composition, although it can be contained in a separate solution or process sheet, or it can be incorporated in any processing composition penetrable layer of the film unit. When the developing agent is separate from the alkaline processing composition, the alkaline composition serves to activate the developing agent and provide a medium in which the developing agent can contact and develop silver halide.

A variety of silver halide developing agents can be used in processing the film units of this invention. The choice of an optimum developing agent will depend on the type or film unit with which it is used and the particular dye image-providing material employed. Suitable developing agents can be selected from such compounds as hydroquinone, aminophenols e.g., N-methylaminophenol), 1-phenyl-3-pyrazolidinone, 1-phenyl-4,4-dimethyl-3-pyrazolidinone, 1-phenyl-4-methyl-4-hydroxymethyl-3-pyrazolidinone, and N,N,N',N'-tetramethyl-p-phenylenediamine. The non-chromogenic developers in this list are preferred for use in dye transfer film units, since they have a reduced propensity to stain dye image-receiving layers.

Image transfer film units and features thereof useful in the practice of this invention are further illustrated by Research Disclosure, Item 15162, cited above and here incorporated by reference. Specifically contemplated layer order arrangements for use in image transfer film units containing high aspect ratio tabular grain emulsions are disclosed by Evans et al., concurrently filed, cited above and here incorporated by reference for this teaching. Similar layer order arrangements, but not restricted to the use of tabular grain emulsions, are disclosed by Hoyen, cited above and here incorporated by reference.

EXAMPLE 1

Control Coating—A

A 0.8 μm octahedral core-shell AgBr emulsion was prepared by a double-jet precipitation technique. The core grains consisted of a 0.55 μm octahedral AgBr chemically sensitized with 0.78 mg $Na_2S_2O_3.5H_2O$/mole Ag and 1.18 mg $KAuCl_4$/mole Ag for 30 minutes at 85° C. The core-shell emulsion was chemically sensitized with 1.0 mg $Na_2S_2O_3.5H_2O$/mole Ag for 30 minutes at 74° C. The emulsion was coated on a polyester film support at 6.46 g/m$^2$ silver and 4.84 g/m$^2$ gelatin. The emulsion layer also contained spectral sensitizing dyes anhydro-3,3'-bis-(3-sulfopropyl)-4,5-benzothiacyamine hydroxide, sodium salt (Dye A) and anhydro-5,5'-dichloro-3,9-diethyl-3'-sulfopropyl oxacyanine hydroxide (Dye B) each at 200 mg mole Ag and nucleators: formyl-4-[2-(2,4-di-t-amylphenoxy)butanamido]phenylhydrazine and formyl-4-(3-n-hexylureido)phenylhydrazine, each at 100 mg/mole Ag. The element was overcoated with 1% bis(vinylsulfonylmethyl)ether by weight based on total gel content.

Invention Coating

A 0.25 μm cubic core-shell AgBr emulsion was prepared by a double-jet precipitation technique. The core consisted of a 0.20 μm cubic AgBr chemically sensitized with 12 mg $Na_2S_2O_3.5H_2O$/mole Ag and 10 mg $KAuCl_4$/mole Ag for 40 minutes at 70° C. The core-shell emulsion was either not intentionally chemically sensitized or chemically sensitized under various conditions (see Table I). The emulsions (the larger, 0.8 μm, core-shell emulsion and the above smaller, 0.25 μm, core-shell emulsion) were blended at equal amounts of silver and were coated on a polyester film support at 4.31 g/m$^2$ total silver coverage and 3.23 g/m$^2$ total gelatin coverage. The emulsion layer also contained spectral sensitizing dyes , Dye A and Dye B, each at 200 mg mole Ag and nucleators; formyl-4-[2-(2,4-di-t-amylphenoxy)butanamido]phenylhydrazine and formyl-4-(3-n-hexylureido)-phenylhydrazine, each at 100 mg/mole Ag.

The coatings were exposed to a Xenon lamp for $10^{-5}$ second through a 0–3.0 density step tablet (0.15 density steps) plus a 0.86 neutral density filter and with a filter to simulate a P11 phosphor emitting at a wavelength maximum of 465 nm. The coatings were processed in a temperature controlled tray which was automatically rocked for agitation for 90 seconds at 38° C. in Developer I. Antifoggant levels were optimized for each coating. Results are shown below in Table I. As the results show, good discrimination resulting in high $D_{max}$ and low $D_{min}$ is obtained for both the control at a higher Ag laydown and invention coatings a lower Ag laydown. Furthermore the invention coatings, although at a lower Ag laydown, yielded higher $D_{max}$ values than the control. Also the invention coatings showed comparable and, with no sulfur or gold surface sensitization of the smaller core-shell grains, greater speeds than the control. The results also indicate that the invention coatings work well with no intentional surface sensitization on the small core-shell emulsion as well as with varying levels of sulfur or sulfur and gold surface sensitization.

TABLE I

| | Silver Coverage (g/m$^2$) | Surface Sensitization of Smaller Grain Emulsions (mg/Ag mole) $Na_2S_2O_3.5H_2O$ | $KAuCl_4$ | Developer Antifoggant Level.(g/L) MBT[1] | ± PMT[2] | $D_{max}$ | $D_{min}$ | Speed |
|---|---|---|---|---|---|---|---|---|
| Control A | 6.46 | — | — | 0.05 | 0.08 | 3.65 | 0.17 | 291 |
| Invention A | 4.31 | 0 | 0 | 0.1 | 0.04 | 4.0 | 0.09 | 322 |
| Invention B | 4.31 | 4 | 0 | 0.05 | 0.06 | 4.7 | 0.14 | 304 |

TABLE I-continued

| | Silver Coverage ($g/m^2$) | Surface Sensitization of Smaller Grain Emulsions (mg/Ag mole) $Na_2S_2O_3.5H_2O$ | $KAuCl_4$ | Developer Antifoggant Level.(g/L) MBT[1] ± | PMT[2] | $D_{max}$ | $D_{min}$ | Speed |
|---|---|---|---|---|---|---|---|---|
| Invention C | 4.31 | 8 | 0 | 0.05 | 0.06 | 5.0 | 0.17 | 298 |
| Invention D | 4.31 | 3 | 2 | 0.05 | 0.06 | 5.1 | 0.15 | 200 |

[1]5-Methylbenzotriazole
[2]1-Phenyl-2-tetrazoline-5-thione

COMPARATIVE EXAMPLE 2

Control Coating—A—Same as in Example 1.

Control Coating—B

A 0.2 μm cubic AgBr emulsion was prepared by a double-jet precipitation technique. The negative emulsion was surface sensitized with 6 mg $Na_2S_2O_3.5H_2O$/mole Ag+5 mg $KAuCl_4$/mole Ag for 40 minutes at 70° C. This was coated together in a 1:1 blend with the 0.8 μm octahedral core-shell emulsion as in Example 1. Exposure and processing were the same as in Example 1 except the development time was 75 seconds. The results are shown in Table II. These results show that if the smaller emulsion is not an internally sensitized core-shell, but a surface only sensitized emulsion, then poor image discrimination, i.e., high $D_{min}$, is obtained.

TABLE II

| | Silver Coverage ($g/m^2$) | Developer Antifoggant Level (g/L) MBT | PMT | $D_{max}$ | $D_{min}$ | Speed |
|---|---|---|---|---|---|---|
| Control A | 6.46 | 0.05 | 0.08 | 3.65 | 0.16 | 289 |
| Control B | 4.31 | 0.05 | 0.08 | 5.0 | 4.8 | |

EXAMPLE 3

Control Coatings

This coating was similar to Control Coating A, except that the spectral sensitizer 5,5'-dimethoxy-3,3'-bis(3-sulfopropyl)selenacyanine was used in place of Dye A 3,3'-disulfopropylbenzo-1,2-naphthothiazolecyanine. Either the combination nucleators of Control Coating A (Nucleators I) or 2-methyl-6-thiourethane-3-propynyl-quinaldinium trifluoromethyl sulfonate (Nucleator II) at 50 mg/mole Ag was used.

Invention Coatings

A 0.25 μm cubic core-shell AgBr emulsion was prepared by the double-jet precipitation technique. The core consisted of a 0.20 μm cubic AgBr chemically sensitized with 12 mg $Na_2S_2O_3.5H_2O$/mole Ag and 10 mg $KAuCl_4$/mole Ag for 40 minutes at 70° C. The core-shell emulsion was not intentionally chemically sensitized and was mixed and coated with the larger core-shell emulsion (0.8 μm) similarly as in Example 1, except for substitution of the same dye and nucleator described above in the control coatings. The coatings were exposed and processed as in Example 1, except that the coatings containing Nucleator II were also developed for 60 seconds in Developer II (see Appendix), which does not contain any amines. Results are shown in Table III. The results show the utility of differing nucleating agents, developer formulations, and spectral sensitizing dyes.

TABLE III

| Item | | Silver Coverage ($g/m^2$) | Developer | Nucleator | Developer Antifoggant Level (g/L) MBT | PMT | $D_{max}$ | $D_{min}$ | Speed |
|---|---|---|---|---|---|---|---|---|---|
| 1 | Control | 6.46 | I | I | 0.05 | 0.08 | 4.05 | 0.04 | 301 |
| 2 | Invention | 4.31 | I | I | 0.05 | 0.07 | 4.5 | 0.07 | 287 |
| 3 | Control | 6.46 | I | II | 0.15 | 0.16 | 3.95 | 0.07 | 288 |
| 4 | Invention | 4.31 | I | II | 0.10 | 0.12 | 4.3 | 0.09 | 323 |
| 5 | Control | 6.46 | II | II | 0.20 | 0 | 3.7 | 0.18 | 243 |
| 6 | Invention | 4.31 | II | II | 0.05 | 0 | 4.3 | 0.15 | 243 |

EXAMPLE 4

The emulsions, dyes and coating procedure for the Control and Invention coatings were similar to those in Example 3, but no nucleators were present in the emulsion layer. The coatings were exposed and processed as in Example 3 except using Developers III and IV (see Appendix), which both contain nucleators. The development time was 60 seconds. The results are shown in Table IV. The results show that good image discrimination and speed can be obtained not only with nucleators incorporated in the coating, but also by processing coatings containing no nucleators in a developer containing hydrazine or hydrazide nucleators.

TABLE IV

| | Silver Coverage ($g/m^2$) | Developer | Developer Antifoggant Level (g/L) MBT | PMT | $D_{max}$ | $D_{min}$ | Speed |
|---|---|---|---|---|---|---|---|
| Control | 6.46 | III | 0.05 | 0.10 | 4.2 | 0.06 | 301 |
| Invention | 4.31 | III | 0.05 | 0.08 | 3.95 | 0.03 | 317 |
| Control | 6.46 | IV | 0.05 | 0.13 | 4.25 | 0.07 | 289 |
| Invention | 4.31 | IV | 0.05 | 0.11 | 4.4 | 0.05 | 306 |

EXAMPLE 5

Control Coating—Same as in Example 3.

Invention Coating

A 0.21 μm octahedral core-shell AgBr emulsion was prepared by a double-jet precipitation technique. The core consisted of a 0.14 μm octahedral AgBr chemically sensitized with 7 mg $Na_2S_2O_3.5H_2O$/mole Ag and 10.5 mg $KAuCl_4$/mole Ag for 30 minutes at 80° C. The core-shell grains were not intentionally chemically sensitized. Except for substitution of the 0.21 μm core-shell grains for the smaller grain population, the emulsion layer and coating procedure were similar to that of Example 3.

The coatings were exposed and processed as in Example 3. Results are shown in Table V. The results show that a small octahedral, core-shell emulsion as well as a small cubic core-shell yields good discrimination and speed.

TABLE V

| | Silver Coverage ($g/m^2$) | Developer Antifoggant Level (g/L) MBT | PMT | $D_{max}$ | $D_{min}$ | Speed |
|---|---|---|---|---|---|---|
| Control | 6.46 | 0.05 | 0.08 | 4.05 | 0.04 | 301 |
| Invention | 4.31 | 0.05 | 0.07 | 4.7 | 0.06 | 277 |

Developer I

| Component[1] | Grams per Liter |
|---|---|
| Water, tap | 850.0 |
| (Ethylenedinitrilo)tetraacetic acid, disodium salt (EDTA) | 1.0 |
| Potassium Hydroxide, 45% | 22.0 |
| 5-Methylbenzotriazole[3] (MBT) | 0.05–0.15 |
| 1-Phenyl-2-tetrazoline-5-thione (PMT)[3] | 0.04–0.16 |
| Sodium Sulfite, Anhydrous | 75.0 |
| 4,4'-Dimethyl-1-phenyl-3-pyrazolidinone | 0.4 |
| Sodium bromide | 8.0 |
| Sodium bicarbonate | 7.0 |
| 2-Ethylaminoethanol | 58.6 |
| 3,3-Diaminodipropylamine | 4.0 |
| Hydroquinone | 40.0 |
| Potassium hydroxide, 45% | 7.0[2] |
| Water to 1 liter | |

[1]Add each component in the order given and allow to dissolve before the next addition.
[2]Sufficient to adjust pH to 10.70 at 80° F. (32° C.).
[3]Level adjusted to optimize sensitometric response for individual coatings.

Developer II

| Component | Grams per Liter |
|---|---|
| $Na_2SO_3$ | 65. g |
| NaBr | 4.3 g |
| Elon ® (N—methyl-p-aminophenolsulfate) | 10. g |
| Hydroquinone | 40. g |
| 45% KOH | 59. g[1] |
| (Ethylenedinitrilo)tetraacetic acid, tetrasodium Salt | 5. g |
| 5-Methylbenzotriazole[2] | — |
| Water to | 1000. ml |

[1]to pH = 11.0
[2]Level adjusted to optimize sensitometric response for individual coatings.

Developer III

Same as Developer I, but with 1.0 g/l of formyl-2-p-tolylhydrazine.

Developer IV

Same as Developer I, but with 2.0 g/l of 4-(β-methanesulfonamidoethyl)phenylhydrazine hydrochloride.

The invention has been described in detail with particular reference to preferred embodiments thereof, but it will be understood that variations and modifications can be effected within the spirit and scope of the invention.

What is claimed is:

1. A radiation-sensitive emulsion particularly adapted to forming a direct-positive image comprised of a dispersing medium a first, core-shell silver halide grain population having a coefficient of variation of less than 20%, and a second silver halide grain population capable of *internally forming a latent image by* internally trapping photolytically generated electrons and substantially incapable of forming a surface latent image within the direct-positive exposure latitude of the first grain population, said second grain population having an average diameter less than 70% that of said first grain population, and said first and second silver halide grain populations being present in a weight ratio of from 5:1 to 1:5.

2. A radiation-sensitive emulsion according to claim 1 additionally including a nucleating agent incorporated therein.

3. A radiation-sensitive emulsion according to claim 2 wherein said nucleating agent is chosen from the class consisting of aromatic hydrazide nucleating agents, N-substituted cycloammonium quaternary salt nucleating agents, and mixtures thereof.

4. A radiation-sensitive emulsion according to claim 2 wherein said nucleating agent is a hydrazide of the formula $$D-\overset{H}{N}-\overset{H}{N}-\phi\text{-}M$$

wherein

D is an acyl group;

$\phi$ is a phenylene or a halo-, alkyl, or alkoxy-substituted phenylene group; and M is a moiety capable of restricting mobility.

5. A radiation-sensitive emulsion according to claim 1 wherein said first, core-shell grain population is sensitized with at least one of sulfur, selenium, and gold.

6. A radiation-sensitive emulsion according to claim 1 wherein said first, core-shell grain population contains a divalent or trivalent metal dopant capable of reducing rereversal.

7. A radiation-sensitive emulsion according to claim 1 wherein said second silver halide grain population is comprised of converted-halide silver halide grains.

8. A radiation-sensitive emulsion according to claim 1 wherein said second silver halide grain population is comprised of core-shell silver halide grains.

9. A radiation-sensitive emulsion according to claim 8 wherein said core-shell grains of said second grain population are substantially free of surface chemical sensitization.

10. A radiation-sensitive emulsion according to claim 8 wherein said core-shell grains of said second grain population are internally chemically sensitized.

[11. A radiation-sensitive emulsion according to claim 1 wherein said second silver halide grain population is internally fogged.]

12. A radiation-sensitive emulsion according to claim 1 wherein at least said core-shell grains of said first grain population are comprised of bromide.

13. A radiation-sensitive emulsion according to claim 12 wherein said bromide containing silver halide grains are additionally comprised of iodide.

14. A radiation-sensitive emulsion according to claim 1 wherein said second grain population has an average diameter less than 50% that of said first grain population.

15. A radiation-sensitive emulsion according to claim 14 wherein said second grain population has an average diameter less than 40% that of said first grain population.

16. A radiation-sensitive emulsion according to claim 1 wherein said first and second silver halide grain populations are present in a weight ratio of from 2:1 to 1:3.

17. A radiation-sensitive emulsion according to claim 1 wherein said first, core-shell grain population is comprised of tabular grains.

18. A radiation-sensitive emulsion according to claim 17 and wherein said grains of said first grain population having a thickness of less than 0.5 micron and a diameter greater then 0.6 micron have an average aspect ratio greater than 8:1 and account for greater than 50% of the total projected surface area of said first grain population.

19. In a direct-positive photographic element comprised of a support and at least one radiation-sensitive emulsion layer, the improvement wherein said emulsion layer is comprised of an emulsion according to claim 1, 2, 3, 4, 5, 6, 7, 8, 9, 10, [11], 12, 13, 14, 15, 16, 17, or 18.

20. Processing in a surface developer an imagewise exposed photographic element according to claim 19

(a) in the presence of a nucleating agent, or (b) with light flashing of the exposed photographic element during processing.

21. In a multicolor direct-positive photographic element comprised of a support and, located thereon, p1 emulsion layers for separately recording blue, green, and red light each comprised of a dispersing medium, core-shell silver halide grains, and a nucleating agent, the improvement comprising, said core-shell silver halide grains in at least one of said emulsion layers being comprised of a first core-shell grain population having a coefficient of variation of less than 20% and chemically sensitized wih at least one of sulfur, selenium, and gold, and a second core-shell grain population substantially free of surface chemical sensitization, *internally chemically sensitized, capable of internally forming a latent image,* and substantially incapable of forming a surface latent image within the direct-positive exposure latitude of the first grain population, said second grain population having an average diameter less than 40% that of said first grain population, and said first and second grain populations being present in a weight ratio of from 2:1 to 1:3.

22. In a photographic element according to claim 21 the further improvement in which said core-shell grains are comprised of bromide.

23. In a photographic element according to claim 21 the further improvement in which said second core-shell grain population increases the minimum density of the photographic element to no more than 10% of its maximum density.

24. In a photographic element according to claim 21 the further improvement in which said first core-shell grain population contains a divalent or trivalent metal ion chosen from the group consisting of cadmium, lead, and erbium in an amount sufficient to reduce rereversal.

25. In a photographic image transfer film unit comprising a support, at least one emulsion layer located on said support containing a dispersing medium, core-shell silver halide grains, and a nucleating agent, a dye-image-providing material present in said emulsion layer or a layer adjacent thereto, and a receiving layer for providing a viewable transferred dye image following imagewise exposure and processing of said emulsion layer, the improvement comprising, said core-shell silver halide grains in at least one of said emulsion layers being comprised of a first core-shell grain population having a coefficient of variation of less than 20% and chemically sensitized with at least one of sulfur, selenium, and gold, and a second core-shell grain population substantially free of surface chemical sensitization, *internally chemically sensitized, capable of internally forming a latent image,* and substantially incapable of forming a surface latent image within the direct-positive exposure latitude of the photographic element, said second grain population having an average diameter less than 40% that of said first grain population, and said first and second populations being present in a weight ratio of from 2:1 to 1:3.

26. In a photographic element according to claim 25 the further improvement in which said core-shell grains are comprised of bromide.

27. In a photographic element according to claim 25 the further improvement in which said second core-shell grain population increases the minimum density of said emulsion layers to no more than 20% of their maximum density.

28. In a photographic element according to claim 15 the further improvement in which said first core-shell grain population contains a divalent or trivalent metal ion chosen from the group consisting of cadmium, lead, and erbium in an amount sufficient to reduce rereversal.

29. In a black-and-white photographic element capable of producing a direct-positive silver image and comprised of a support and, located thereon, at least one emulsion layer comprised of a dispersing medium, core-shell silver halide grains, and a nucleating agent, the improvement comprising, said core-shell silver halide grains in at least one emulsion layer being comprised of a first core-shell grain population having a coefficient of variation of less than 20% and chemically sensitized with at least one of sulfur, selenium, and gold, and a second core-shell grain population capable of *internally forming a latent image by* internally trapping photolytically generated electrons and substantially incapable of forming a surface latent image within the direct-positive exposure latitude of the photographic element, said second grain population having an average diameter less than 40% that of said first grain population, and said first and second silver halide grain populations being present in a weight ratio of from 2:1 to 1:3.

30. In a photographic element according to claim 29, the further improvement in w hich said photographic element is capable of producing an image contrast of greater than 8.

31. In a photographic element according to claim 29, the further improvement in which said first core-shell grain population exhibits a coefficient of variation of less than 10% and said photographic element is capable of producing a contrast of greater than 10.

32. In a photographic element according to claim 29, the further improvement in which said second core-shell grain population is substantially free of surface chemical sensitization.

33. In a photographic element according to claim 29, the further improvement in which said core-shell grains are comprised of bromide.

34. In a photographic element according to claim 29, the further improvement in which said second core-shell grain population increases the minimum density of the photographic element to no more than 5% of its maximum density.

35. In a photographic element according to claim 29, the further improvement in which said first core-shell grain population contains a divalent or trivalent metal ion chosen from the group consisting of cadmium, lead, and erbium in an amount sufficient to reduce rereversal.

* * * * *